(12) United States Patent
Ozawa et al.

(10) Patent No.: US 12,092,166 B2
(45) Date of Patent: Sep. 17, 2024

(54) POWER TRANSMISSION APPARATUS

(71) Applicant: Kabushiki Kaisha F.C.C., Hamamatsu (JP)

(72) Inventors: Yoshihiko Ozawa, Hamamatsu (JP); Han Hiong Chen, Hamamatsu (JP); Katsu Yoshimoto, Hamamatsu (JP)

(73) Assignee: KABUSHIKI KAISHA F.C.C., Shizuoka (JP)

( * ) Notice: Subject to any disclaimer, the term of this patent is extended or adjusted under 35 U.S.C. 154(b) by 0 days.

(21) Appl. No.: 18/019,309

(22) PCT Filed: Jul. 29, 2021

(86) PCT No.: PCT/JP2021/028049
§ 371 (c)(1),
(2) Date: Feb. 2, 2023

(87) PCT Pub. No.: WO2022/030349
PCT Pub. Date: Feb. 10, 2022

(65) Prior Publication Data
US 2023/0272825 A1    Aug. 31, 2023

(30) Foreign Application Priority Data
Aug. 6, 2020  (JP) ................ 2020-134038

(51) Int. Cl.
*F16D 13/74*  (2006.01)
*F16D 13/56*  (2006.01)

(52) U.S. Cl.
CPC ........... *F16D 13/74* (2013.01); *F16D 13/56* (2013.01); *F16D 2013/565* (2013.01)

(58) Field of Classification Search
CPC ......... F16D 13/52–2013/565; F16D 13/72–74
See application file for complete search history.

(56) References Cited

U.S. PATENT DOCUMENTS

| | | |
|---|---|---|
| 4,540,077 A | 9/1985 | Yamamoto et al. |
| 6,401,896 B1 * | 6/2002 | Schnepf ........... F16D 13/74 |
| | | 192/70.12 |

(Continued)

FOREIGN PATENT DOCUMENTS

| | | |
|---|---|---|
| JP | 52-024684 Y | 6/1977 |
| JP | 58-50231 U | 4/1983 |

(Continued)

OTHER PUBLICATIONS

Official Communication issued in International Patent Application No. PCT/JP2021/028049, mailed on Sep. 28, 2021.

(Continued)

*Primary Examiner* — Ernesto A Suarez
*Assistant Examiner* — James J Taylor, II
(74) *Attorney, Agent, or Firm* — Keating & Bennett, LLP

(57) ABSTRACT

A power transmission apparatus includes a clutch connected to an output shaft to rotate a wheel of a vehicle, and a clutch pressure plate movable between an operating position where driving and driven clutch plates are pressed against each other so as to enable transmission of a driving force of an engine to the wheel and a non-operating position where a pressing force exerted on the driving and driven clutch plates is released so as to cut off transmission of the driving force of the engine to the wheel. One of the driven clutch plates is attached to a second clutch, and another is attached to the clutch pressure plate. The clutch pressure plate includes an oil flow passage through which oil flows to the driven clutch plate attached to the clutch pressure plate.

6 Claims, 23 Drawing Sheets

(56) References Cited

U.S. PATENT DOCUMENTS

| | | | |
|---|---|---|---|
| 8,011,487 B2* | 9/2011 | Uchiyama | F16D 13/56 |
| | | | 192/89.26 |
| 9,534,639 B2* | 1/2017 | Inayama | F16D 13/56 |
| 10,006,499 B2* | 6/2018 | Nakano | F16D 13/52 |
| 10,895,287 B2* | 1/2021 | Imanishi | F16D 13/56 |
| 2008/0141806 A1 | 6/2008 | Metzinger et al. | |
| 2011/0192699 A1 | 8/2011 | Yazaki et al. | |
| 2019/0257369 A1 | 8/2019 | Tabinoki | |

FOREIGN PATENT DOCUMENTS

| | | |
|---|---|---|
| JP | 2011-163425 A | 8/2011 |
| JP | 2017-172652 A | 9/2017 |
| JP | 2019-143689 A | 8/2019 |
| KR | 10-2018-0013303 A | 2/2018 |

OTHER PUBLICATIONS

Official Communication issued in corresponding European Patent Application No. 21854390.8, mailed on Mar. 21, 2024.

* cited by examiner

POWER TRANSMISSION APPARATUS

BACKGROUND OF THE INVENTION

1. Field of the Invention

The present invention relates to a power transmission apparatus that is able to freely transmit a rotational force of an input to an output, or cut off the rotational force.

2. Description of the Related Art

Usually, a power transmission apparatus included in a motorcycle freely transmits a driving force of an engine to a transmission and a driving wheel or cuts off the driving force. Such a power transmission apparatus includes an input connected to an engine, an output connected to a transmission and a driving wheel, a clutch member connected to the output, and a pressure member that is able to move toward or away from the clutch member. Moving the pressure member toward the clutch member presses driving and driven clutch plates against each other so as to transmit power therebetween. Moving the pressure member away from the clutch member releases a pressing force exerted on the driving and driven clutch plates so as to cut off transmission of the power therebetween.

As disclosed, for example, in JP 2011-163425 A, a power transmission apparatus known in the art includes a clutch member provided with a plurality of oil supply holes. Through the oil supply holes, oil supplied from the center of rotation (i.e., a clutch activation shaft) is allowed to flow to driving and driven clutch plates. Thus, oil is sufficiently suppliable to the driving and driven clutch plates, making it possible to smoothly press the driving and driven clutch plates against each other and release a pressing force exerted thereon.

SUMMARY OF THE INVENTION

In the power transmission apparatus known in the art, the driven clutch plates are attached exclusively to the clutch member, so that oil is allowed to flow from the oil supply holes defined in the clutch member and is thus sufficiently suppliable to the driven clutch plates. A power transmission apparatus including not only driven clutch plates attached to a clutch member but also a driven clutch plate attached to a pressure member, however, has difficulty in allowing oil to flow from oil supply holes defined in the clutch member to the driven clutch plate attached to the pressure member such that the oil is supplied thereto. It is conceivable that depending on the type of power transmission apparatus or the type of vehicle in which a power transmission apparatus is to be used, oil may need to be supplied exclusively to a driven clutch plate attached to a pressure member.

Preferred embodiments of the present invention provide power transmission apparatuses that are each able to supply a sufficient amount of oil to a driven clutch plate attached to a clutch pressure plate.

A power transmission apparatus according to a preferred embodiment of the present invention includes a clutch housing rotatable together with an input that is rotatable with a driving force of an engine of a vehicle, the clutch housing including a plurality of driving clutch plates attached thereto, a clutch including a plurality of driven clutch plates attached thereto, the driven clutch plates being arranged alternately with the driving clutch plates attached to the clutch housing, the clutch being connected to an output capable of rotating a wheel of the vehicle, and a clutch pressure plate movable between an operating position where the driving and driven clutch plates are pressed against each other so as to enable transmission of the driving force of the engine to the wheel and a non-operating position where a pressing force exerted on the driving and driven clutch plates is released so as to cut off transmission of the driving force of the engine to the wheel. The driven clutch plates are attached to the clutch and the clutch pressure plate, and the clutch pressure plate includes an oil flow passage through which oil is allowed to flow to the driven clutch plate attached to the clutch pressure plate.

The power transmission apparatus may include a clutch spring to urge the driving and driven clutch plates in a direction in which the driving and driven clutch plates are to be pressed against each other or in a direction in which the driving and driven clutch plates are to be moved away from each other. The clutch pressure plate includes a housing recess in which the clutch spring is housed, and a flange that is able to press the driven and driving clutch plates against each other. The oil flow passage allows oil to flow toward the flange through the housing recess.

The oil flow passage may include an oil inlet in communication with the housing recess and opening toward a center of the clutch pressure plate, and an oil outlet opening toward a radially outer end of the clutch pressure plate. Oil that has flowed into the housing recess through the oil inlet is allowed to flow out of the oil outlet and then flow to the driven clutch plate attached to the clutch pressure plate.

The oil inlet may include a first hole adjacent to a bottom of the housing recess that receives an end of the clutch spring. The oil outlet may include a second hole adjacent to the flange of the clutch pressure plate. The oil flow passage may include a groove through which oil is allowed to flow from an opening edge of the housing recess to the second hole.

The clutch may include an oil supply hole through which oil is allowed to flow to the driven clutch plates attached to the clutch.

The clutch may include a first clutch connected to the output, and a second clutch having the driven clutch plates attached thereto. Each of the first clutch and the second clutch may include a plurality of the oil supply holes.

In a preferred embodiment of the present invention, the driven clutch plates are attached to the clutch and the clutch pressure plate. The clutch pressure plate is provided with the oil flow passage through which oil is allowed to flow to the driven clutch plate attached to the clutch pressure plate. Accordingly, the oil is able to be sufficiently supplied to the driven clutch plate attached to the clutch pressure plate.

In a preferred embodiment of the present invention, the clutch pressure plate includes the housing recess in which the clutch spring is housed, and the flange that is able to press the driven and driving clutch plates against each other. The oil flow passage allows oil to flow toward the flange through the housing recess. Accordingly, the oil is suppliable through the housing recess to the driven clutch plate attached to the clutch pressure plate.

In a preferred embodiment of the present invention, the oil flow passage includes the oil inlet in communication with the housing recess and opening toward the center of the clutch pressure plate, and the oil outlet opening toward the radially outer end of the clutch pressure plate. Oil that has flowed into the housing recess through the oil inlet is allowed to flow out of the oil outlet and then flow to the driven clutch plate attached to the clutch pressure plate. Accordingly, with centrifugal force, oil flows through the housing recess and is thus smoothly suppliable to the driven clutch plate attached to the clutch pressure plate.

In a preferred embodiment of the present invention, the oil inlet includes the first hole adjacent to the bottom of the housing recess that receives the end of the clutch spring. The oil outlet includes the second hole adjacent to the flange of the clutch pressure plate. The oil flow passage includes the groove through which oil is allowed to flow from the opening edge of the housing recess to the second hole. Accordingly, oil that has flowed into the housing recess through the first hole is allowed to flow to the opening of the housing recess and then flow out of the second hole through the groove. Consequently, the oil is reliably suppliable to the driven clutch plate attached to the clutch pressure plate.

In a preferred embodiment of the present invention, the clutch includes the oil supply hole through which oil is allowed to flow to the driven clutch plates attached to the clutch. Accordingly, oil is sufficiently suppliable to the driven clutch plates attached to the clutch and the driven clutch plate attached to the clutch pressure plate.

In a preferred embodiment of the present invention, the clutch includes the first clutch connected to the output, and the second clutch having the driven clutch plates attached thereto. Each of the first clutch and the second clutch includes a plurality of the oil supply holes. Accordingly, if the clutch is divided into the first clutch and the second clutch, oil would be reliably suppliable to the driven clutch plates attached to the clutch and the driven clutch plate attached to the clutch pressure plate.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Figure 17:
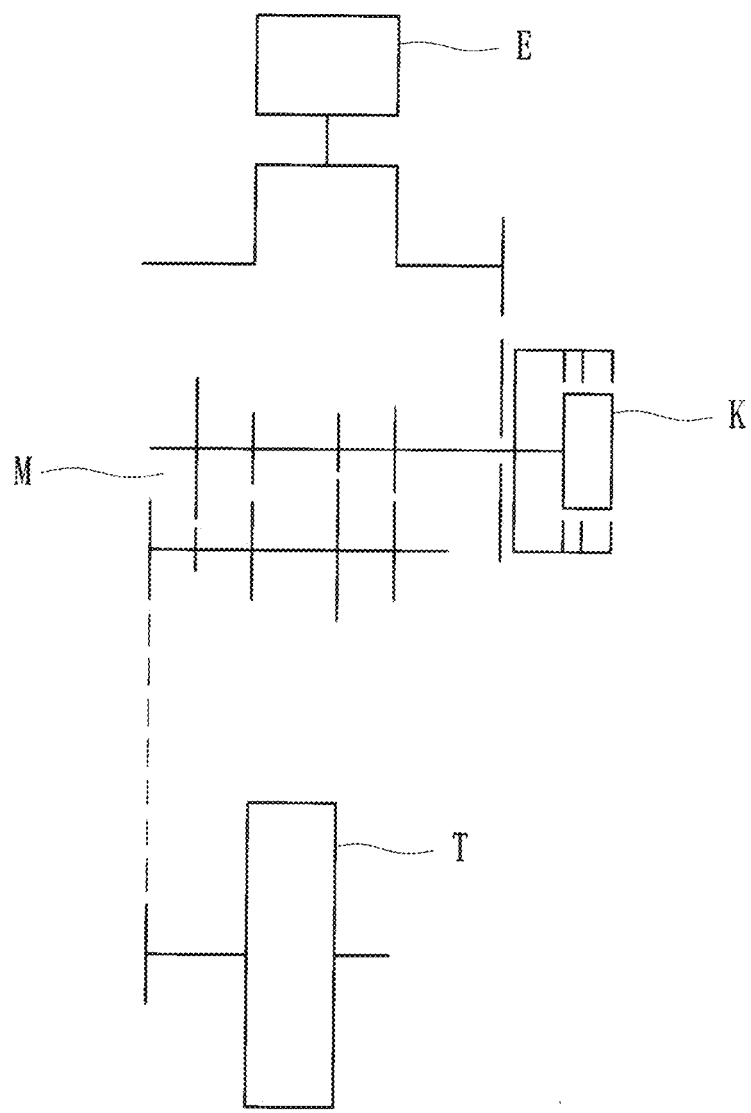
FIG. 17 is a schematic diagram of a vehicle in which the power transmission apparatus is used.

Preferred embodiments of the present invention will be described below in detail with reference to the drawings. As illustrated in FIG. 17, a power transmission apparatus K according to the present preferred embodiment is disposed in a vehicle so as to freely transmit a driving force of an engine E to a driving wheel T through a transmission M or cut off the driving force. As illustrated in FIGS. 1 to 15, the power transmission apparatus K includes a clutch housing 2 provided with an input gear 1 (which is an input) that rotates with the driving force of the engine E of the vehicle, an output shaft 3 (which is an output) connected to the transmission M, a clutch (which includes a first clutch 4a and a second clutch 4b), a clutch pressure plate 5, a plurality of driving clutch plates (6a, 6b), a plurality of driven clutch plates (7a, 7b), a centrifugal clutch 9 including weights 10, and an auxiliary clutch plate 17.

The input gear 1 is rotatable around the output shaft 3 upon receiving a driving force (or a rotational force) transmitted from the engine E. The input gear 1 is connected to the clutch housing 2 with a fastener, such as a rivet. The clutch housing 2 is a cylindrical body with an opening defined at its right end in FIG. 2 and is connected to the input gear 1. The clutch housing 2 is rotatable together with rotation of the input gear 1 with the driving force of the engine E.

Figure 5:
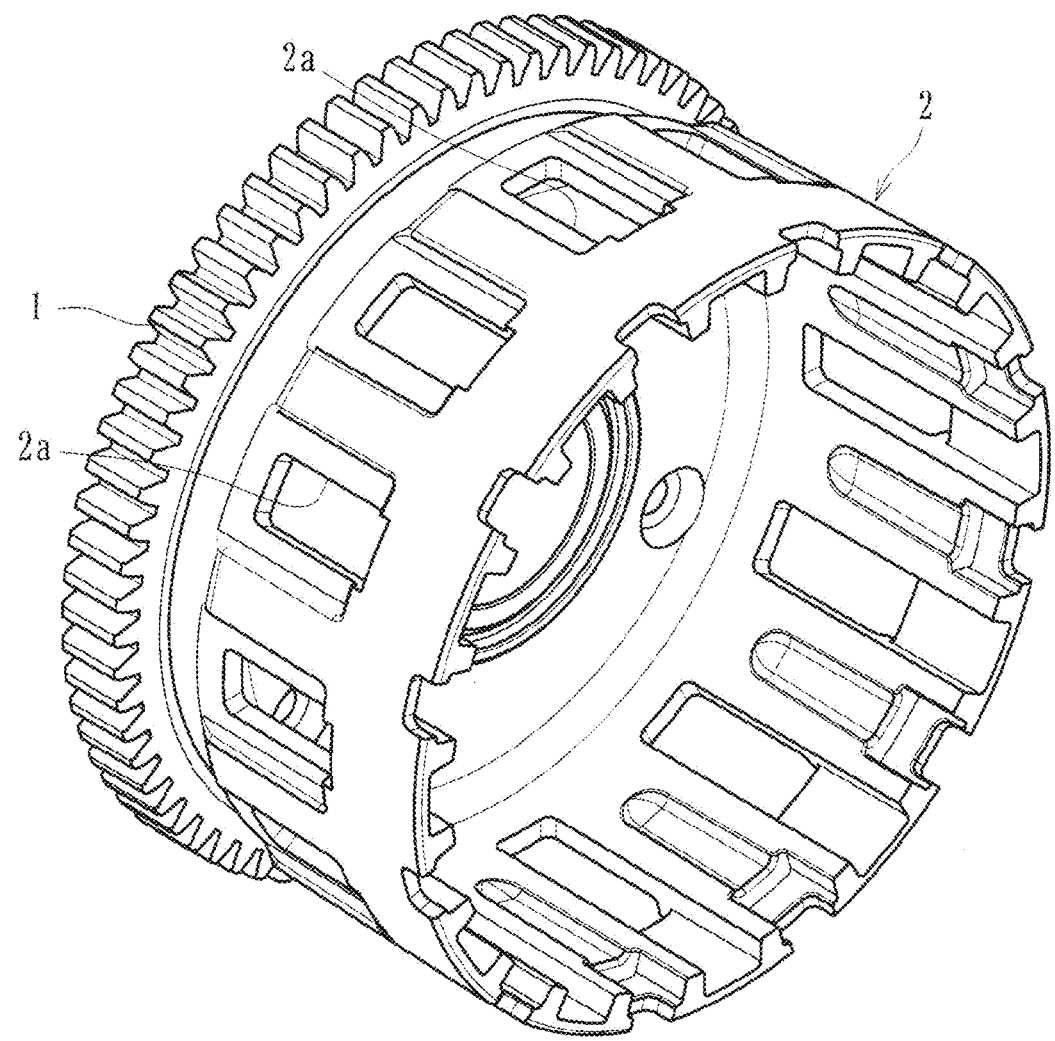
FIG. 5 is a perspective view of a clutch housing of the power transmission apparatus.

As illustrated in FIG. 5, the clutch housing 2 is circumferentially provided with a plurality of cut-outs 2a. The driving clutch plates (6a, 6b) are fitted to the cut-outs 2A and thus attached to the clutch housing 2. The driving clutch plates (6a, 6b) are each made of a substantially annular plate material. The driving clutch plates (6a, 6b) are rotatable together with rotation of the clutch housing 2 and slidable in an axial direction (which corresponds to a right-left direction in FIG. 2). The driving clutch plates 6a are attached to the clutch housing 2 so as to be adjacent to the second clutch 4b. The driving clutch plate 6b is attached to the clutch housing 2 so as to be adjacent to the clutch pressure plate 5.

The driven clutch plates 7a are attached to the clutch (which includes the first clutch 4a and the second clutch 4b). The driven clutch plates 7a are arranged alternately with the driving clutch plates 6a attached to the clutch housing 2. The clutch is connected to the output shaft 3 (i.e., the output), which is able to rotate the driving wheel T through the transmission M of the vehicle. The clutch includes two components (i.e., the first clutch 4a and the second clutch 4b) assembled to each other.

Figure 6:
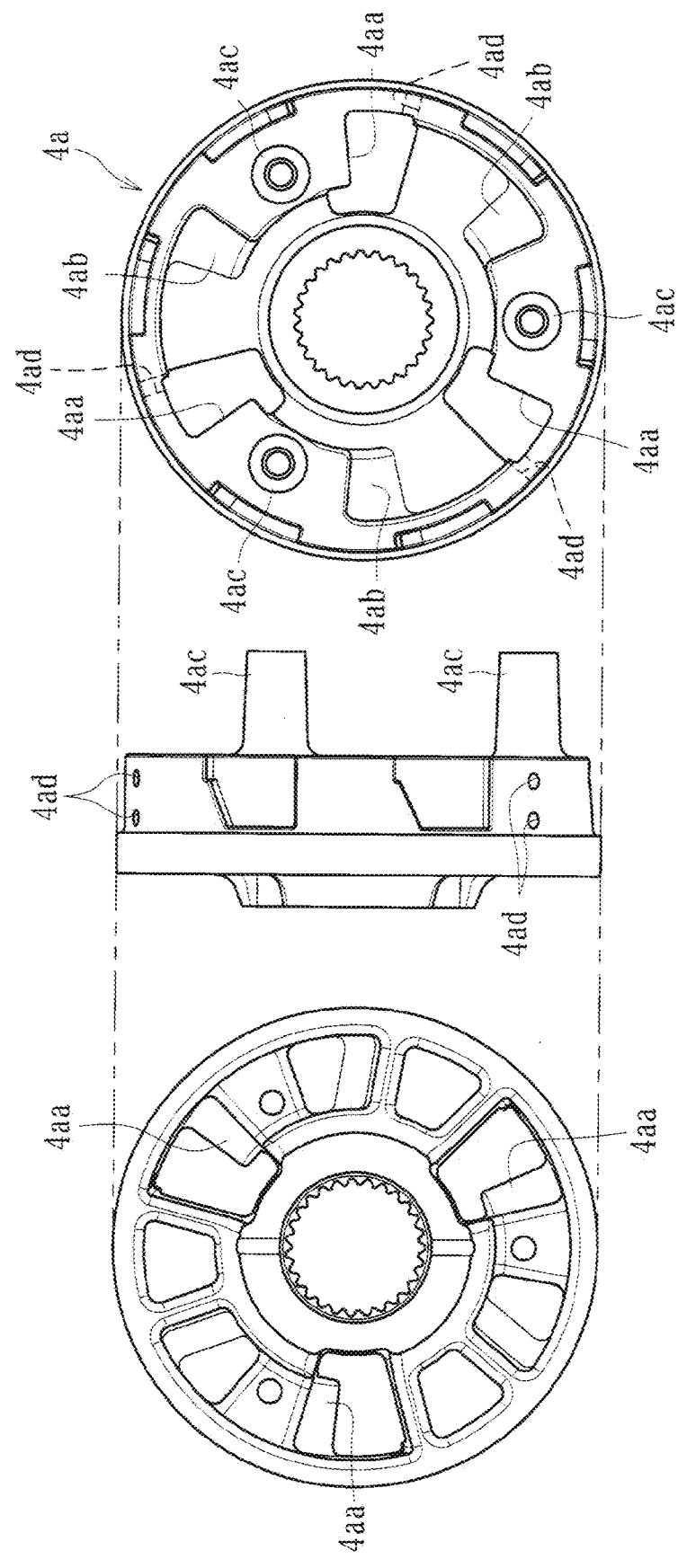
FIG. 6 is a three-view drawing of a first clutch of the power transmission apparatus.
Figure 7:
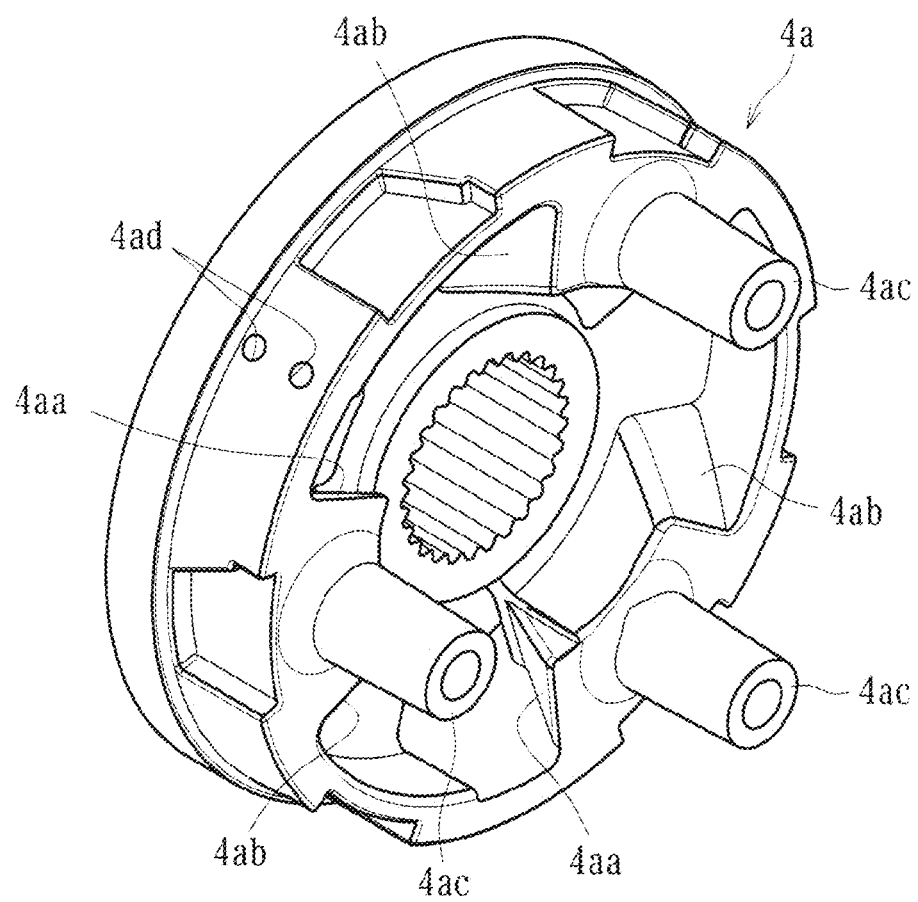
FIG. 7 is a perspective view of the first clutch.

The output shaft 3 is inserted through an insertion hole (see FIGS. 6 and 7) defined in the center of the first clutch 4a. A gear provided on the first clutch 4a and a gear provided on the output shaft 3 are in mesh with each other so as to be connected to each other in the direction of rotation. As illustrated in FIGS. 6 and 7, the first clutch 4a includes inclined surfaces 4aa defining a pressing assist cam, and inclined surfaces 4ab defining a back torque limiter cam. The reference signs "4ac" in FIGS. 6 and 7 each indicate a boss provided with an insertion hole for a bolt B for connection between the first clutch 4a and a securing structure 8.

Figure 1:
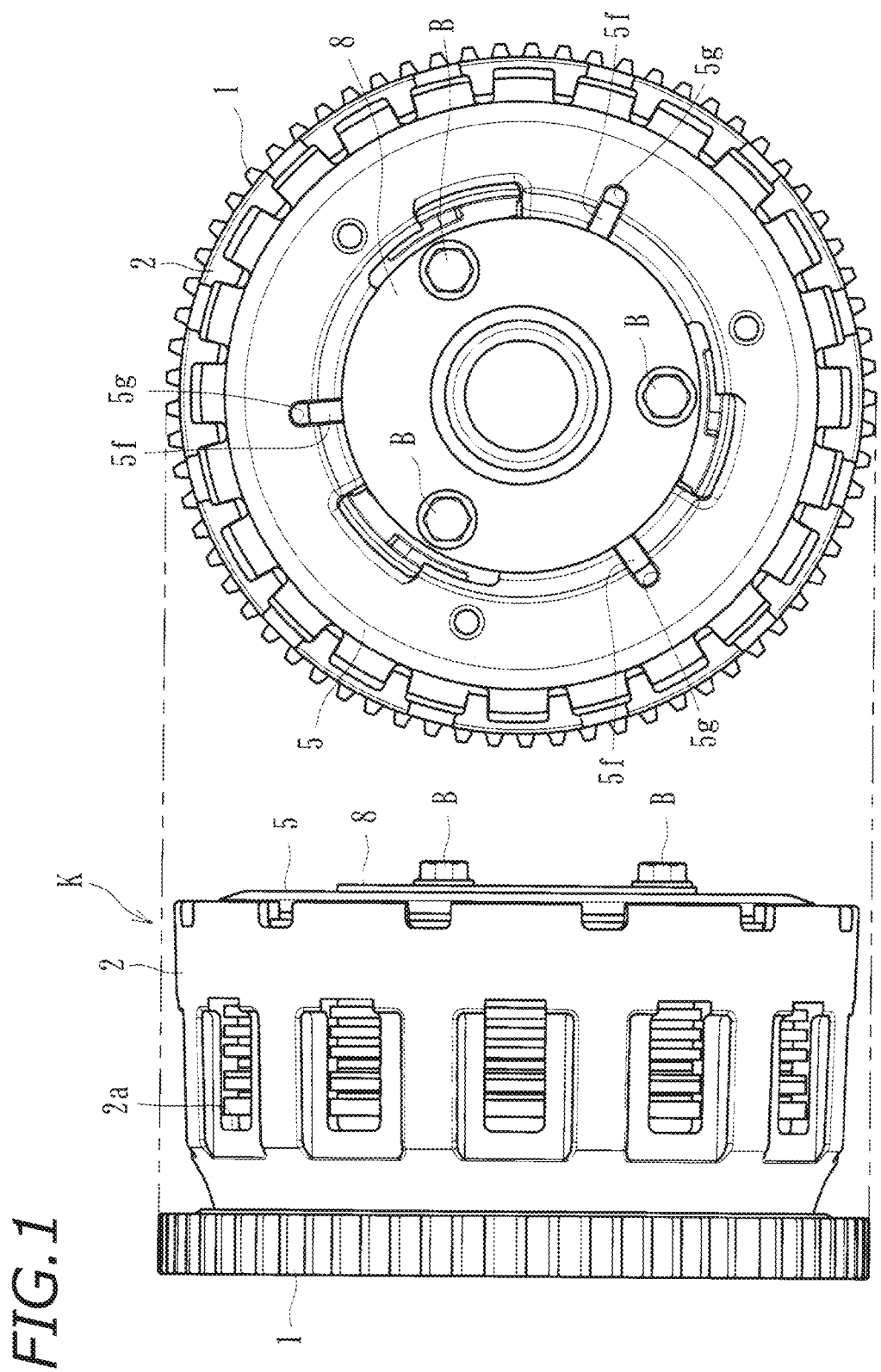
FIG. 1 is an external view of a power transmission apparatus according to a preferred embodiment of the present invention.
Figure 2:
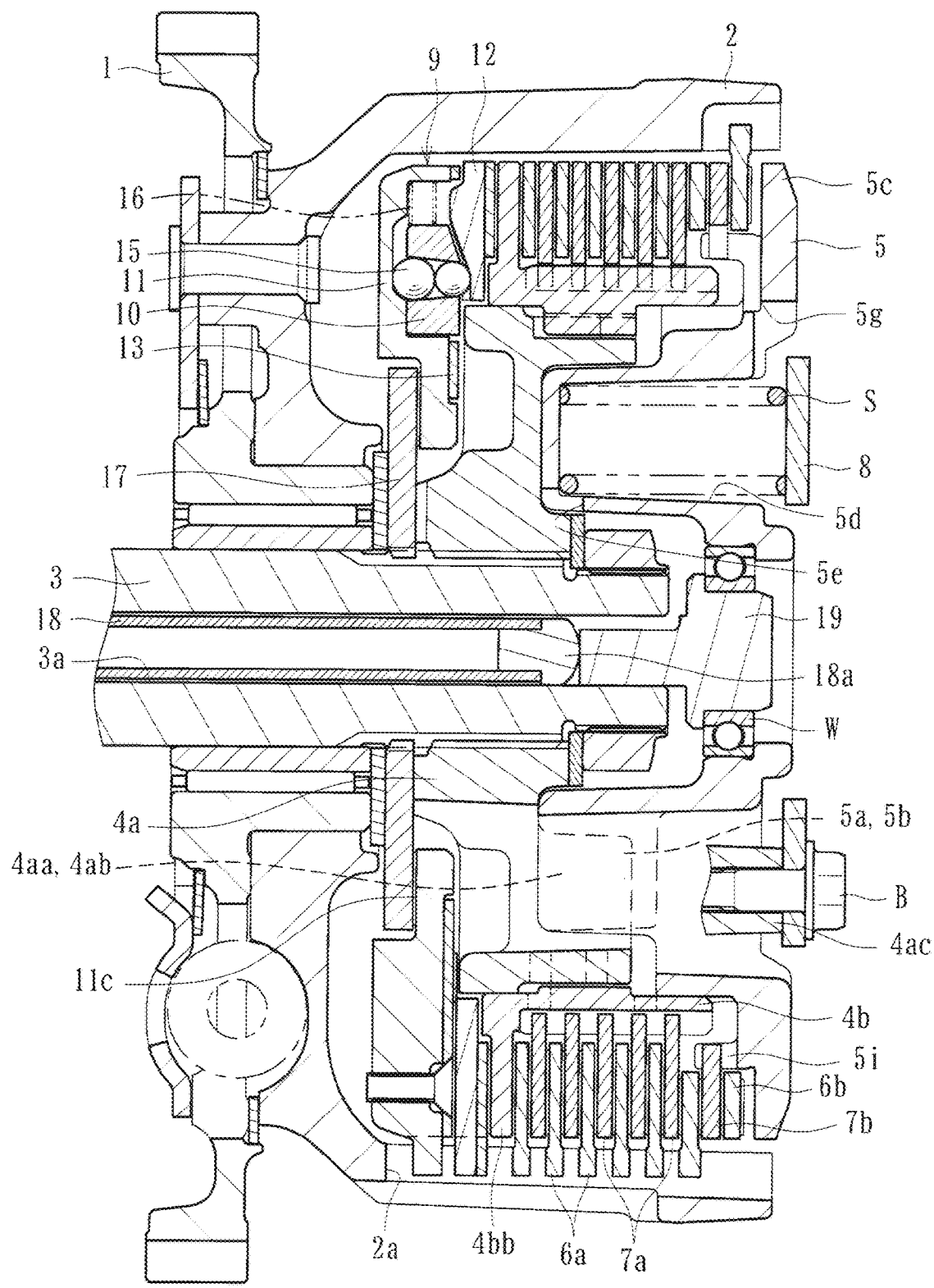
FIG. 2 is a vertical cross-sectional view of an internal structure of the power transmission apparatus.

As illustrated in FIG. 2, the output shaft 3 inserted through the first clutch 4a is provided with an insertion hole 3a extending in the axial direction. Oil is supplied into the clutch housing 2 through the insertion hole 3a. An operator 18, which is a rod, is inserted into the insertion hole 3a. An operating portion 18a is attached to an end of the operator 18. The operating portion 18a is assembled to the operator 18 such that the operating portion 18a is in abutment with a link 19. The link 19 is connected to a bearing W supporting the clutch pressure plate 5 such that the clutch pressure plate 5 is rotatable. Operating a clutch actuator (not illustrated) moves the operator 18 rightward in FIG. 2, so that the operating portion 18a pushes the link 19. Accordingly, the clutch pressure plate 5 is pushed rightward and is thus movable from an operating position to a non-operating position.

Figure 3:
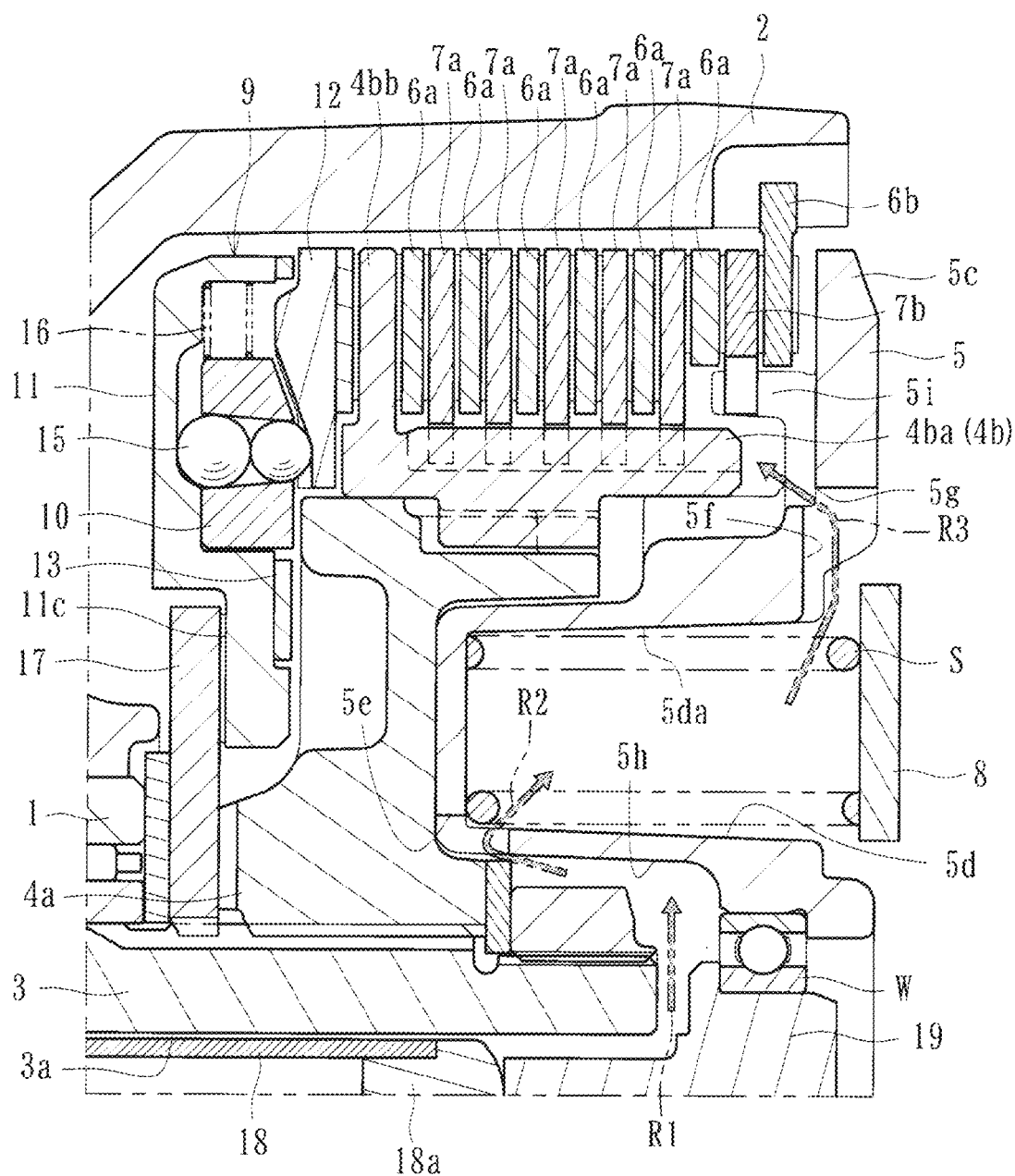
FIG. 3 is a partially enlarged view of the power transmission apparatus illustrated in FIG. 2.
Figure 4:
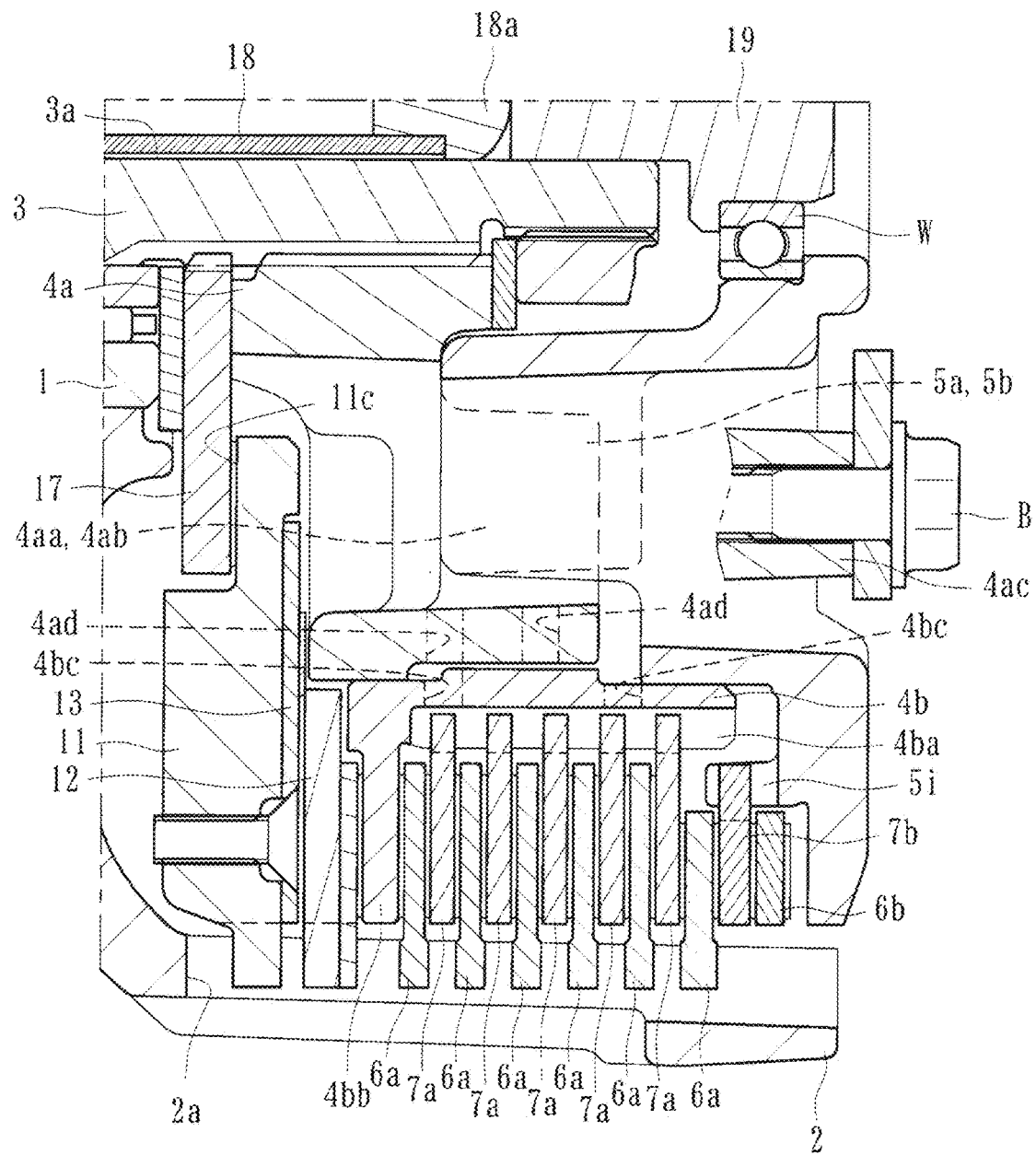
FIG. 4 is a partially enlarged view of the power transmission apparatus illustrated in FIG. 2.
Figure 8:
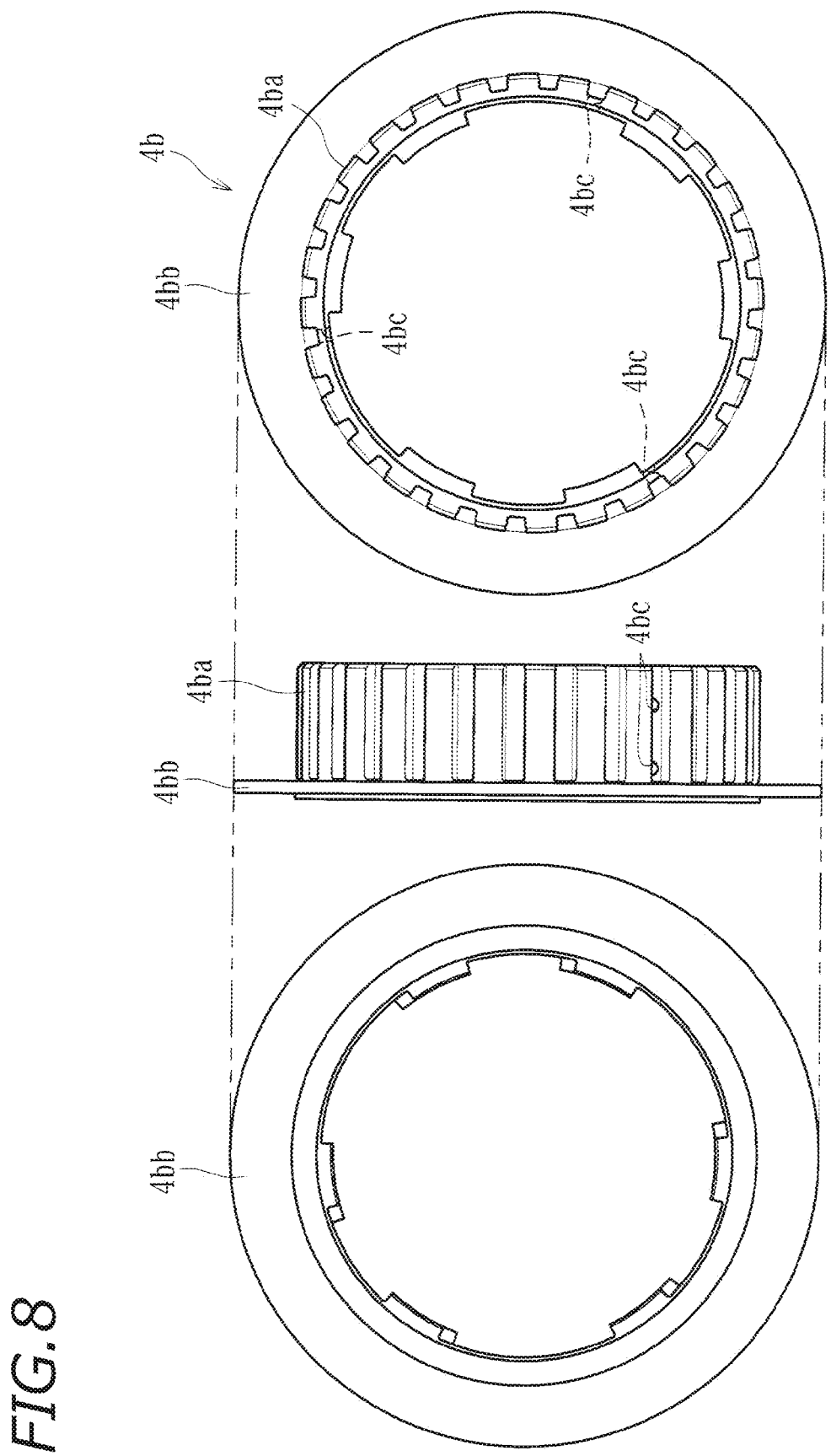
FIG. 8 is a three-view drawing of a second clutch of the power transmission apparatus.
Figure 9:
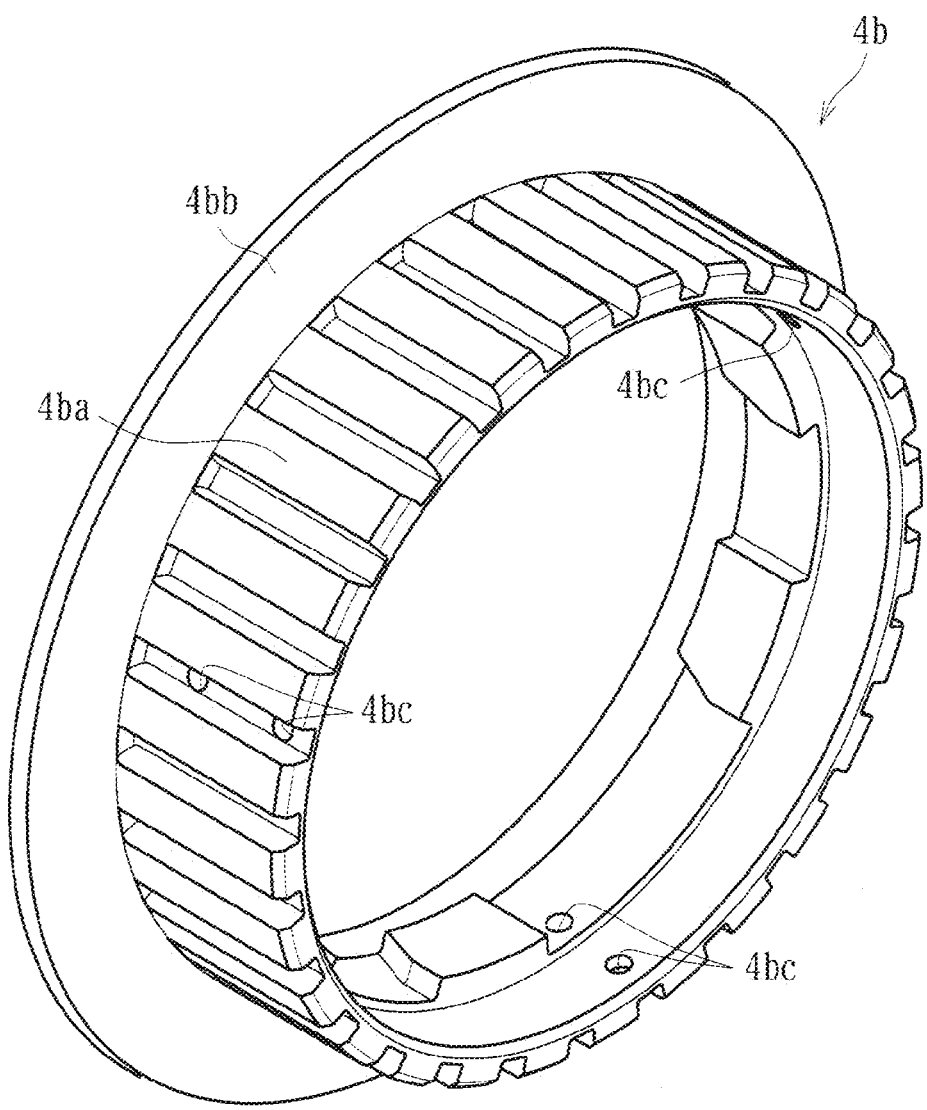
FIG. 9 is a perspective view of the second clutch.

As illustrated in FIGS. 8 and 9, the second clutch 4b is an annular body provided with a flange 4bb. The driven clutch plates 7a are spline-fitted to spline-fitting portions 4ba provided on the outer peripheral surface of the second clutch 4b and are thus attached to the second clutch 4b. As illustrated in FIGS. 2 to 4, the clutch pressure plate 5 is assembled to the clutch (which includes the first clutch 4a and the second clutch 4b) such that the driving clutch plates (6a, 6b) and the driven clutch plates (7a, 7b) are alternately stacked and secured between a flange 5c of the clutch pressure plate 5 and the flange 4bb of the second clutch 4b.

As illustrated in FIGS. 10 to 13, the clutch pressure plate 5 includes a disk provided with the flange 5c extending along the peripheral edge of the clutch pressure plate 5. The clutch pressure plate 5 is movable between the operating position where the driving clutch plates (6a, 6b) and the driven clutch plates (7a, 7b) are pressed against each other so as to enable the transmission of the driving force of the engine E to the wheel, and the non-operating position where a pressing force exerted on the driving clutch plates (6a, 6b) and the driven clutch plates (7a, 7b) is released so as to cut off transmission of the driving force of the engine E to the wheel.

More specifically, as illustrated in FIGS. 8 and 9, the spline-fitting portions 4ba provided on the second clutch 4b define integral projections and depressions along substantially the entire outer peripheral side surface of the second clutch 4b. Fitting the driven clutch plates 7a to recessed grooves that define the spline-fitting portions 4ba restricts movement of the driven clutch plates 7a in the direction of rotation while allowing movement of the driven clutch plates 7a in the axial direction relative to the second clutch 4b. The driven clutch plates 7a are rotatable together with the second clutch 4b.

As illustrated in FIG. 4, the first clutch 4a and the second clutch 4b according to the present preferred embodiment are respectively provided with a plurality of oil supply holes (4ad) and a plurality of oil supply holes (4bc) through which oil is allowed to flow to the driven clutch plates 7a attached to the second clutch 4b. Oil flowing through the insertion hole 3a is supplied to the driven clutch plates 7a through a region adjacent to an end of the output shaft 3, the oil supply holes 4ad defined in the first clutch 4a, and the oil supply holes 4bc defined in the second clutch 4b.

The peripheral edge of the clutch pressure plate 5 is circumferentially provided with a plurality of protrusive fitting portions 5i. The driven clutch plate 7b is fitted to the fitting portions 5i and thus attached to the clutch pressure plate 5. The driven clutch plate 7b is attached to the clutch pressure plate 5, with the driving clutch plate 6b, the driven clutch plate 7b, and an adjacent one of the driving clutch plates 6a being stacked such that a first surface of the driven clutch plate 7b is in contact with the driving clutch plate 6b and a second surface of the driven clutch plate 7b is in contact with the adjacent one of the driving clutch plates 6a. The driven clutch plate 7b is allowed to move in the axial direction relative to the clutch pressure plate 5, prevented from moving in the direction of rotation, and rotatable together with the clutch pressure plate 5.

The driven clutch plates (7a, 7b) are stacked alternately with the driving clutch plates (6a, 6b), making it possible to press adjacent ones of the clutch plates (6a, 6b, 7a, 7b) against each other or release a pressing force exerted on adjacent ones of the clutch plates (6a, 6b, 7a, 7b). The clutch plates (6a, 6b, 7a, 7b) are allowed to slide in the axial direction of the second clutch 4b and the clutch pressure plate 5. Engaging a clutch by pressing the clutch plates (6a, 6b, 7a, 7b) against each other enables a rotational force of the clutch housing 2 to be transmitted to the output shaft 3 through the second clutch 4b and the first clutch 4a. Disengaging the clutch by releasing the pressing force exerted on the clutch plates (6a, 6b, 7a, 7b) causes the first clutch 4a and the second clutch 4b to stop following the rotation of the clutch housing 2 such that no rotational force will be transmitted to the output shaft 3.

Accordingly, a state where the driving clutch plates (6a, 6b) and the driven clutch plates (7a, 7b) are pressed against each other enables transmission of a rotational force (i.e., the driving force of the engine E), which is received by the clutch housing 2, to the driving wheel (or the transmission M) through the output shaft 3 (i.e., the output), and a state where the driving clutch plates (6a, 6b) and the driven clutch plates (7a, 7b) are not pressed against each other makes it possible to cut off transmission of the rotational force (i.e., the driving force of the engine E), which is received by the clutch housing 2, to the output shaft 3 (i.e., the output).

Figure 10:
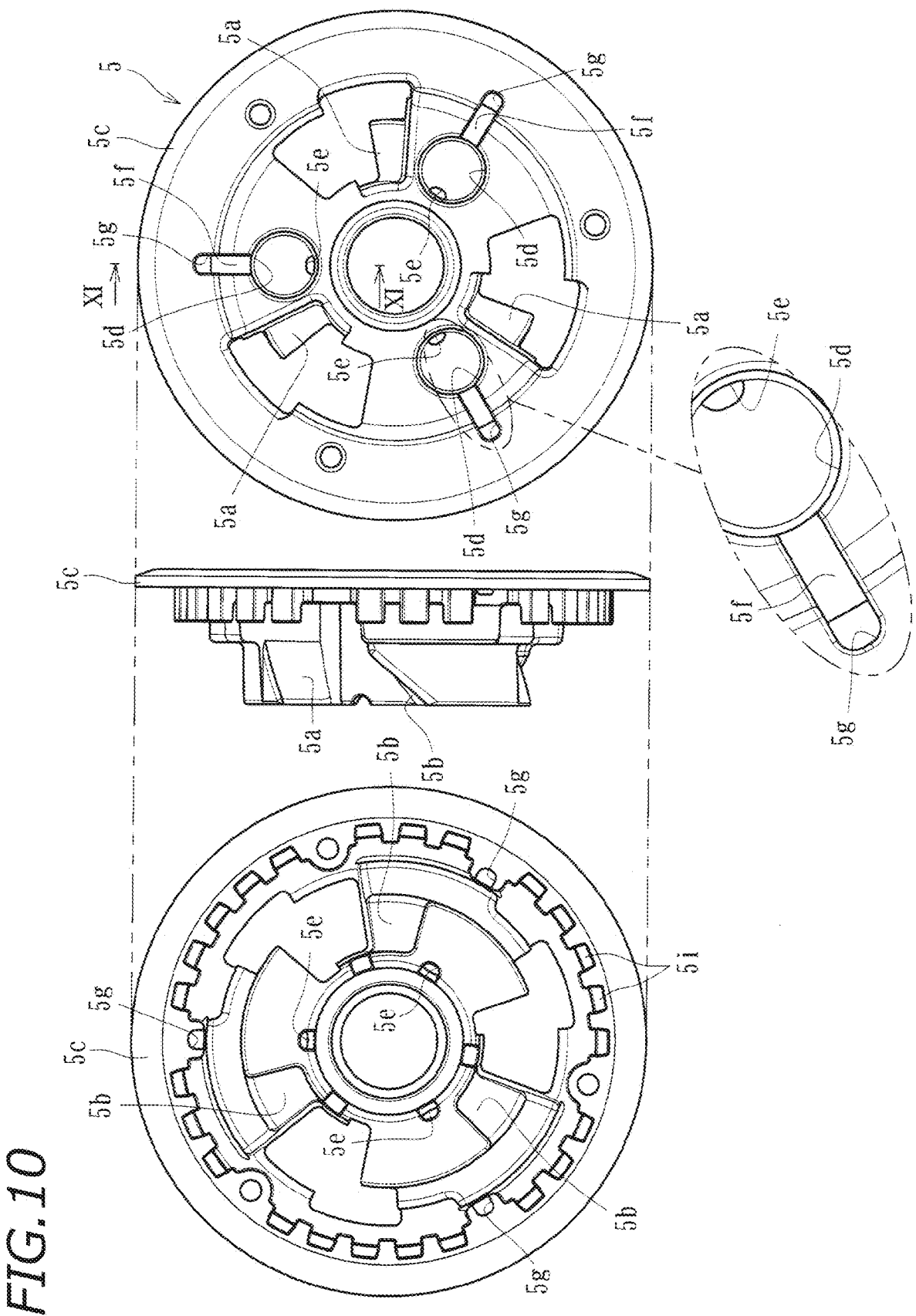
FIG. 10 is a three-view drawing of a clutch pressure plate of the power transmission apparatus.

As illustrated in FIGS. 9 and 10, the clutch pressure plate 5 is circumferentially provided with a plurality of housing recesses 5*d* (for example, three in the present preferred embodiment). Clutch springs S are each fitted into an associated one of the housing recesses 5*d*. As illustrated in FIGS. 2 and 3, one end of each clutch spring S housed in the associated housing recess 5*d* is in abutment with the securing structure 8, such that each clutch spring S urges the clutch pressure plate 5 in a direction in which the driving clutch plates (6*a*, 6*b*) and the driven clutch plates (7*a*, 7*b*) are to be pressed against each other.

Operating the clutch actuator (not illustrated) moves the operator 18, which pushes the link 19 rightward in FIG. 2. The clutch pressure plate 5 is thus pushed rightward and moved to the non-operating position, making it possible to press the driving clutch plates (6*a*, 6*b*) and the driven clutch plates (7*a*, 7*b*) against each other or stop pressing the driving clutch plates (6*a*, 6*b*) and the driven clutch plates (7*a*, 7*b*) against each other.

In the present preferred embodiment, as illustrated in FIGS. 6, 7, 10, 12, and 13, the first clutch 4*a* is provided with the inclined surfaces 4*aa* and 4*ab*, and the clutch pressure plate 5 is provided with inclined surfaces 5*a* and 5*b* respectively facing the inclined surfaces 4*aa* and 4*ab*. Specifically, each inclined surface 4*aa* comes into abutment with the associated inclined surface 5*a* so as to provide the pressing assist cam, and each inclined surface 4*ab* comes into abutment with the associated inclined surface 5*b* so as to provide the back torque limiter cam.

Figure 16A:
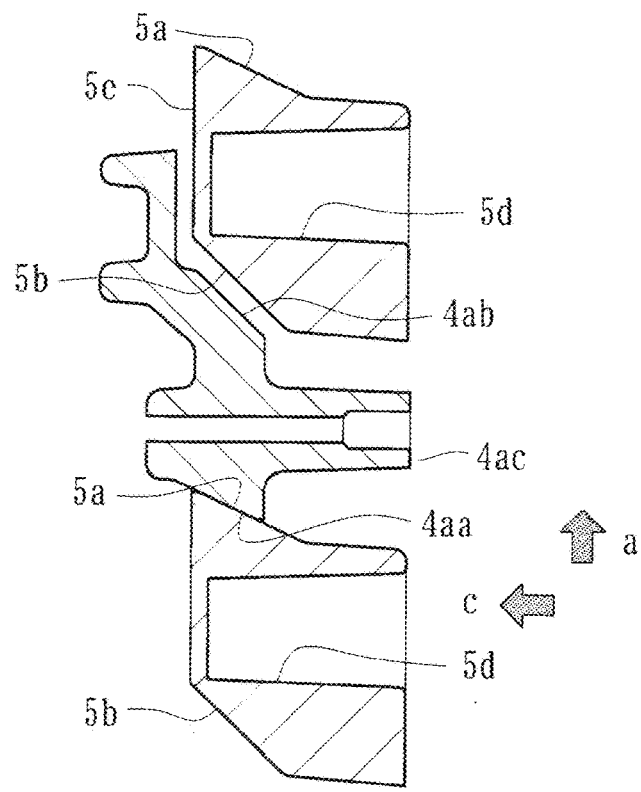
FIG. 16A is a schematic diagram illustrating how a pressing assist cam of the power transmission apparatus acts.

Suppose that the rotation speed of the engine E is increased and the resulting rotational force received by the input gear 1 and the clutch housing 2 is transmittable to the output shaft 3 through the first clutch 4*a* and the second clutch 4*b* (which means that the weights 10 are each located at a radially outer position). In this case, as illustrated in FIG. 16A, the rotational force is applied to the clutch pressure plate 5 in an a-direction, which exerts a force on the clutch pressure plate 5 in a c-direction in FIG. 16A under the action of the pressing assist cam. The clutch pressure plate 5 is thus moved in a direction in which its flange 5*c* comes closer to the flange 4*bb* of the second clutch 4*b* (i.e., leftward in FIG. 2) so as to increase the pressing force exerted on the driving clutch plates (6*a*, 6*b*) and the driven clutch plates (7*a*, 7*b*).

Figure 16B:
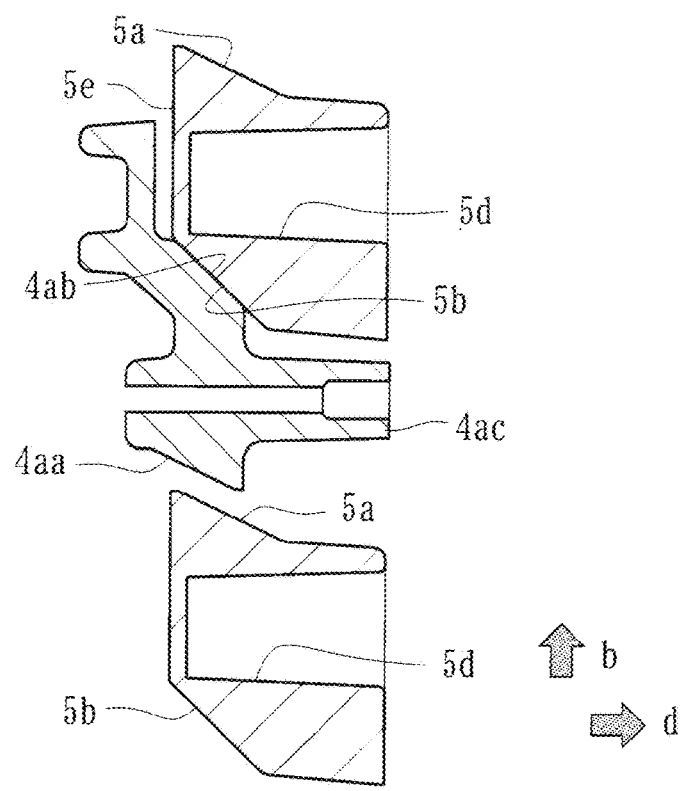
FIG. 16B is a schematic diagram illustrating how a back torque limiter cam of the power transmission apparatus acts.

Suppose that the rotation of the output shaft 3 exceeds the rotation speed of the input gear 1 and the clutch housing 2, resulting in a back torque. In this case, as illustrated in FIG. 16B, a rotational force is applied to the clutch 4 in a b-direction, which moves the clutch pressure plate 5 in a d-direction in FIG. 16B under the action of the back torque limiter cam so as to release the pressing force exerted on the driving clutch plates (6*a*, 6*b*) and the driven clutch plates (7*a*, 7*b*). This makes it possible to prevent a malfunction in the power transmission apparatus K or a power source (i.e., the engine E) caused by the back torque.

Figure 14:
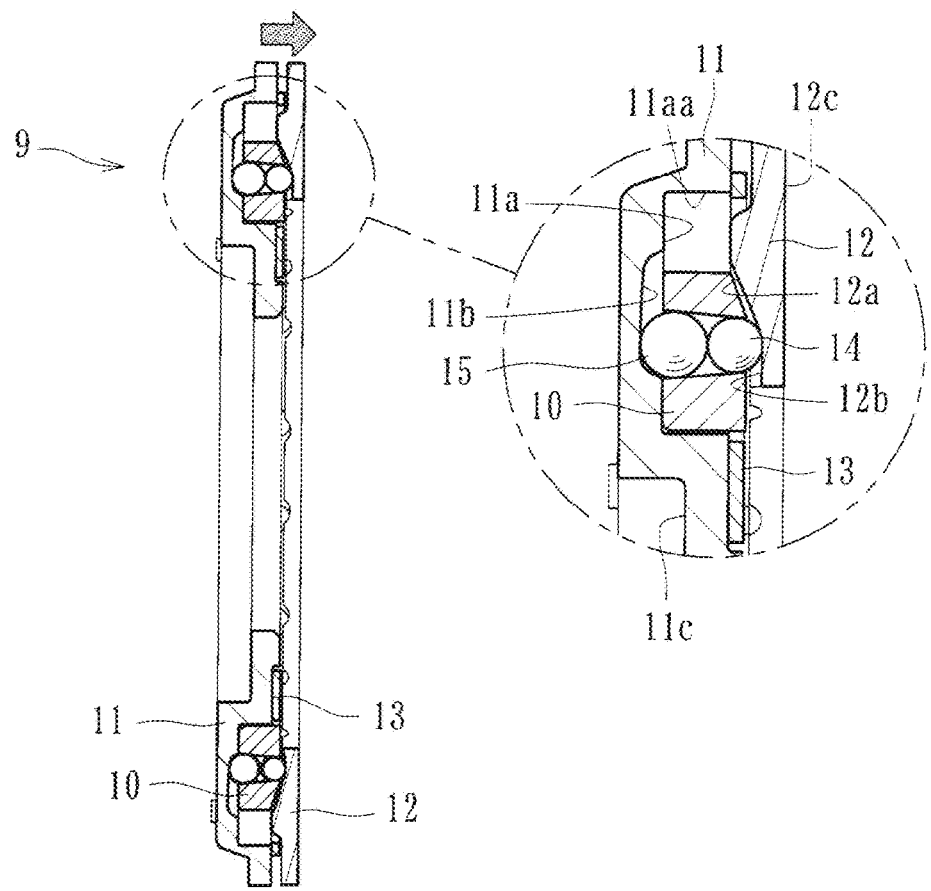
FIG. 14 is a vertical cross-sectional view of a centrifugal clutch of the power transmission apparatus.
Figure 15:
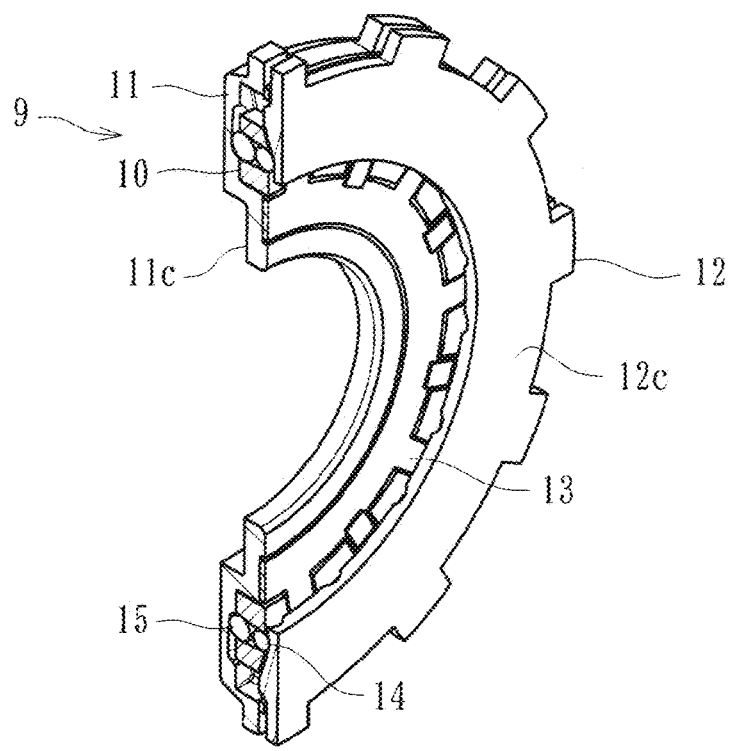
FIG. 15 is a partially cutaway perspective view of the centrifugal clutch.
Figure 18:
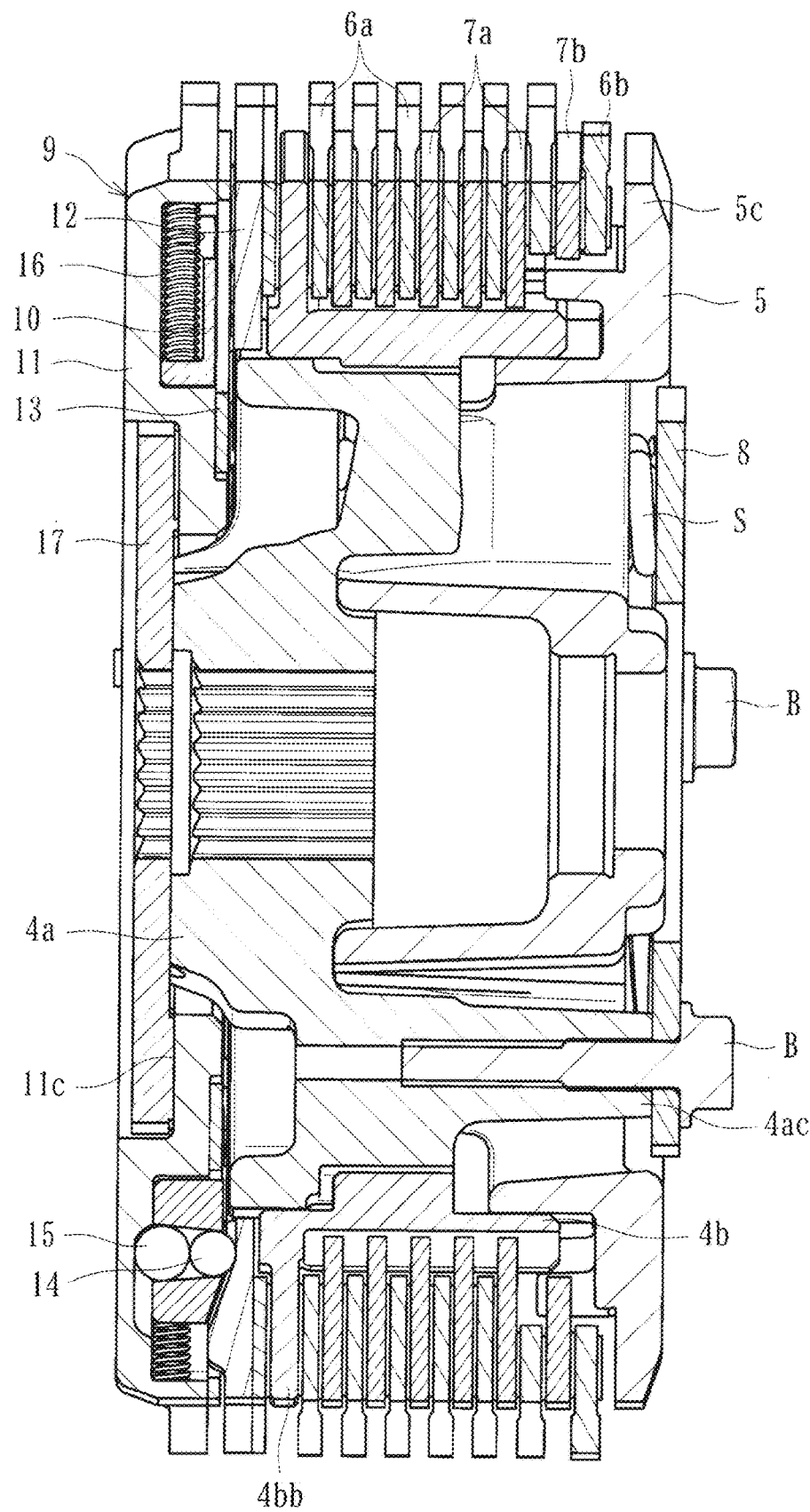
FIG. 18 is a cross-sectional view illustrating a state of the power transmission apparatus where each weight is located at a radially inner position.
Figure 20:
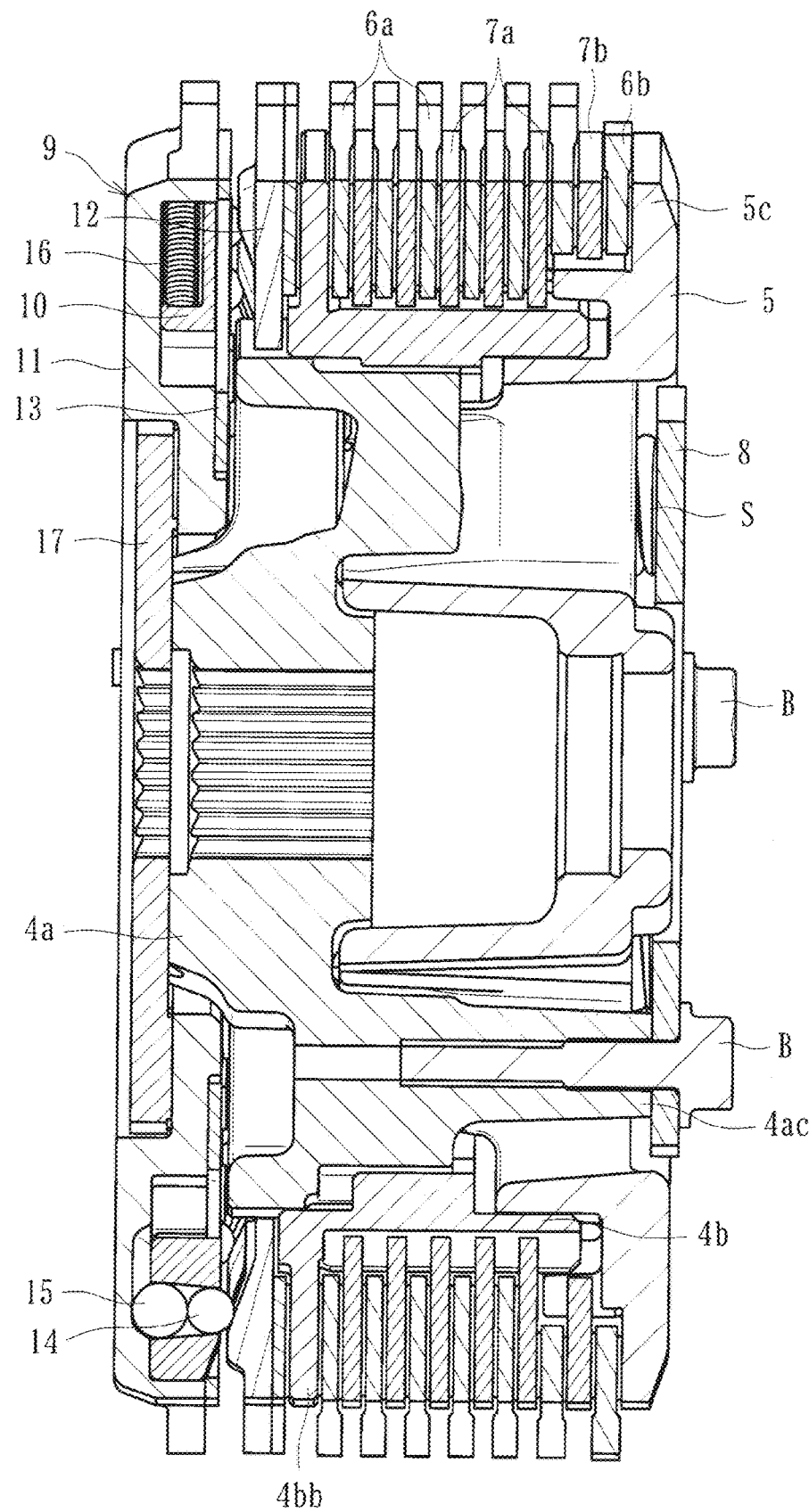
FIG. 20 is a cross-sectional view illustrating a state of the power transmission apparatus where each weight is located at the radially outer position.

As illustrated in FIGS. 14 to 15, the centrifugal clutch 9 includes the weights 10 each movable from a radially inner position (see FIG. 18) to the radially outer position (see FIG. 20) with centrifugal force produced by rotation of the clutch housing 2. When the weights 10 are each located at the radially outer position, the centrifugal clutch 9 presses the driving clutch plates (6*a*, 6*b*) and the driven clutch plates (7*a*, 7*b*) against each other so as to enable transmission of the driving force of the engine E to the wheel (i.e., the driving wheel T). When the weights 10 are each located at the radially inner position, the centrifugal clutch 9 releases the pressing force exerted on the driving clutch plates (6*a*, 6*b*) and the driven clutch plates (7*a*, 7*b*) so as to cut off transmission of the driving force of the engine E to the wheel (i.e., the driving wheel T).

Specifically, the centrifugal clutch 9 includes the weights 10, each of which is a substantially symmetrical polygonal body, a holder 11 including a support 13 attached thereto, a press 12, first spherical bodies 14, second spherical bodies 15, and springs 16, each of which is a coil spring. The holder 11 and the press 12 are each circumferentially provided with a plurality of protrusions. Similarly to the driving clutch plates 6, the protrusions are fitted to the cut-outs 2*a* of the clutch housing 2 such that the holder 11 and the press 12 are attached to the clutch housing 2. Accordingly, the holder 11 and the press 12 are each movable in the axial direction of the clutch housing 2 and in engagement with the clutch housing 2 in the direction of rotation so as to be rotatable together with the clutch housing 2.

As illustrated in FIG. 14, the weights 10 are each housed in an associated one of housing portions 11*a* of the holder 11. When no centrifugal force is applied to the weights 10, the weights 10 are each held at the radially inner position. Application of centrifugal force to the weights 10 moves the weights 10 outward against the urging force of the springs 16 such that each weight 10 reaches the radially outer position. The holder 11 holds the weights 10 such that each weight 10 is movable between the radially inner position and the radially outer position. As illustrated in FIG. 15, the holder 11 is an annular structure. The holder 11 includes the housing portions 11*a* which are arranged in the circumferential direction of the holder 11 and in which the weights 10 are housed, grooves 11*b* defined in the housing portions 11*a*, and a pushing surface 11*c*.

Each housing portion 11*a* has a recessed shape conforming to the shape and moving range of the associated weight 10. An outer peripheral wall surface 11*aa* of each housing portion 11*a* is allowed to abut against one end of the associated spring 16. The support 13 is secured to a surface of the holder 11, which is provided with the housing portions 11*a*. The weights 10 are thus held between the holder 11 and the press 12, with the support 13 interposed therebetween, such that the weights 10 are movable radially.

Movement of each weight 10 from the radially inner position to the radially outer position causes the press 12 to move in a direction in which the driving clutch plates (6*a*, 6*b*) and the driven clutch plates (7*a*, 7*b*) are stacked, i.e., rightward in FIG. 2, such that the driving clutch plates (6*a*, 6*b*) and the driven clutch plates (7*a*, 7*b*) are pressed against each other. Specifically, as illustrated in FIG. 15, the press 12 is an annular structure. The press 12 includes inclined grooves 12*a* arranged in the circumferential direction of the press 12, grooves 12*b* each defined adjacent to the associated inclined groove 12*a*, and a pushing surface 12*c*.

Each inclined groove 12*a* is defined in a portion of the press 12 facing the associated weight 10. Each inclined groove 12*a* is inclined upward from its inner portion to its outer portion. Thus, when the clutch housing 2 is stationary, each weight 10 is held at the radially inner position with the urging force of the associated spring 16 (see FIG. 18). Rotation of the clutch housing 2 applies centrifugal force to the weights 10 so as to move the weights 10 along the inclined grooves 12*a* inclined upward. This moves the press 12 in a direction away from the holder 11, i.e., in the direction in which the driving clutch plates (6*a*, 6*b*) and the driven clutch plates (7*a*, 7*b*) are to be pressed against each other (see FIGS. 19 and 20).

When the holder 11 and the press 12 are assembled to each other, with the weights 10 interposed therebetween, each inclined groove 12a faces the associated weight 10 as illustrated in FIGS. 14 and 15. With centrifugal force, each weight 10 moves from the radially inner position to the radially outer position along the associated inclined groove 12a, which moves the press 12 in a direction indicated by the arrow in FIG. 14 (i.e., rightward in FIG. 14). The pushing surface 12c of the press 12 thus pushes the driving clutch plates (6a, 6b) and the driven clutch plates (7a, 7b) such that the driving clutch plates (6a, 6b) and the driven clutch plates (7a, 7b) are pressed against each other. The resulting reaction force moves the holder 11 in a direction opposite to the direction indicated by the arrow in FIG. 14 (i.e., leftward in FIG. 14), so that the pushing surface 11c of the holder 11 presses the auxiliary clutch plate 17.

Each first spherical body 14 is a steel ball attached to the associated weight 10. Each first spherical body 14 is partially protruded from a first opening of a through hole defined in the associated weight 10 and is in contact with a rolling contact surface of the press 12 so as to be rollable thereon. Each second spherical body 15 is a steel ball attached to the associated weight 10. Each second spherical body 15 is partially protruded from a second opening of the through hole defined in the associated weight 10 and is in contact with a rolling contact surface of the holder 11 so as to be rollable thereon.

Figure 19:
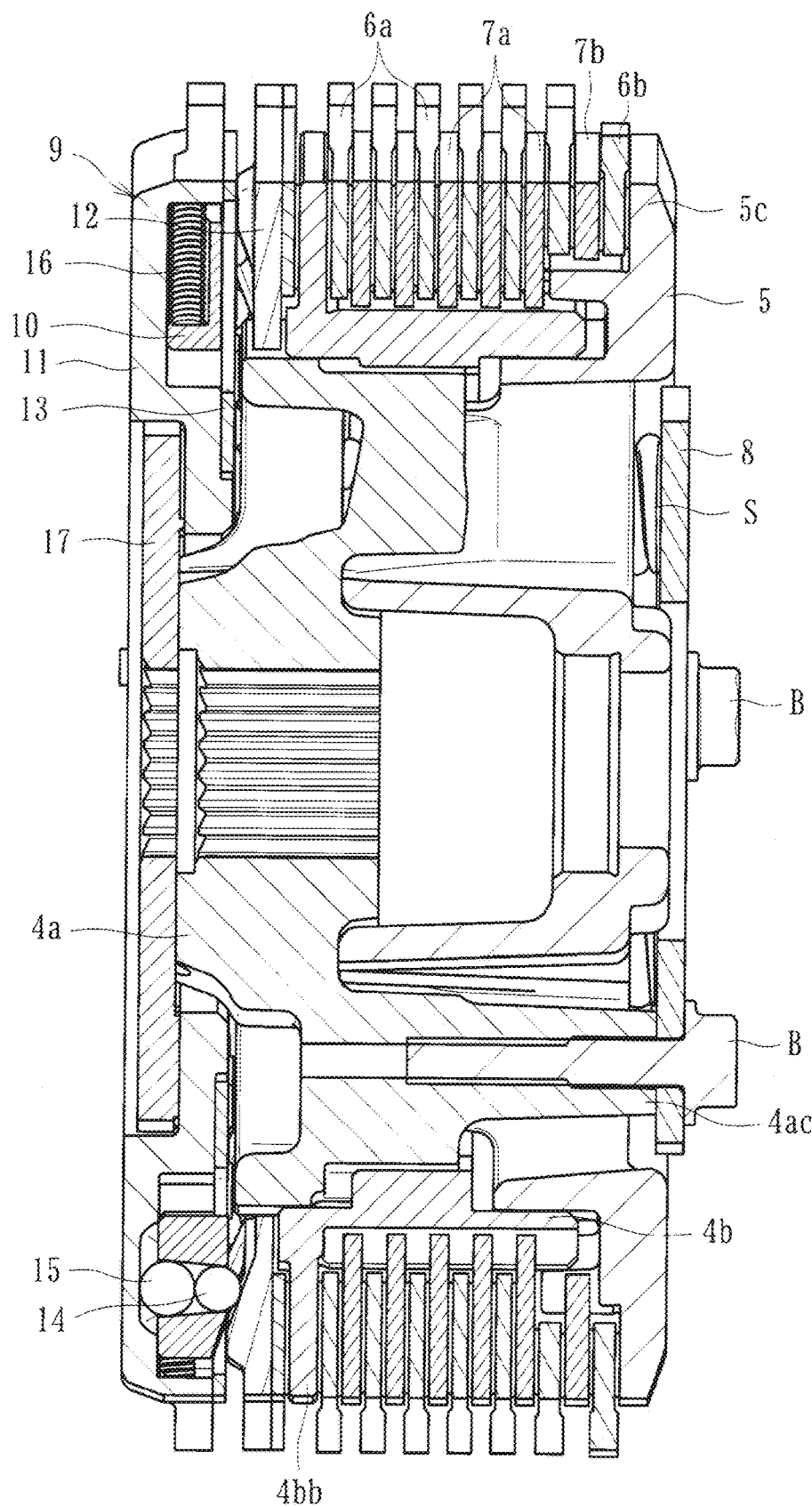
FIG. 19 is a cross-sectional view illustrating a state of the power transmission apparatus where each weight is located at an intermediate position between the radially inner position and a radially outer position.
Figure 21:
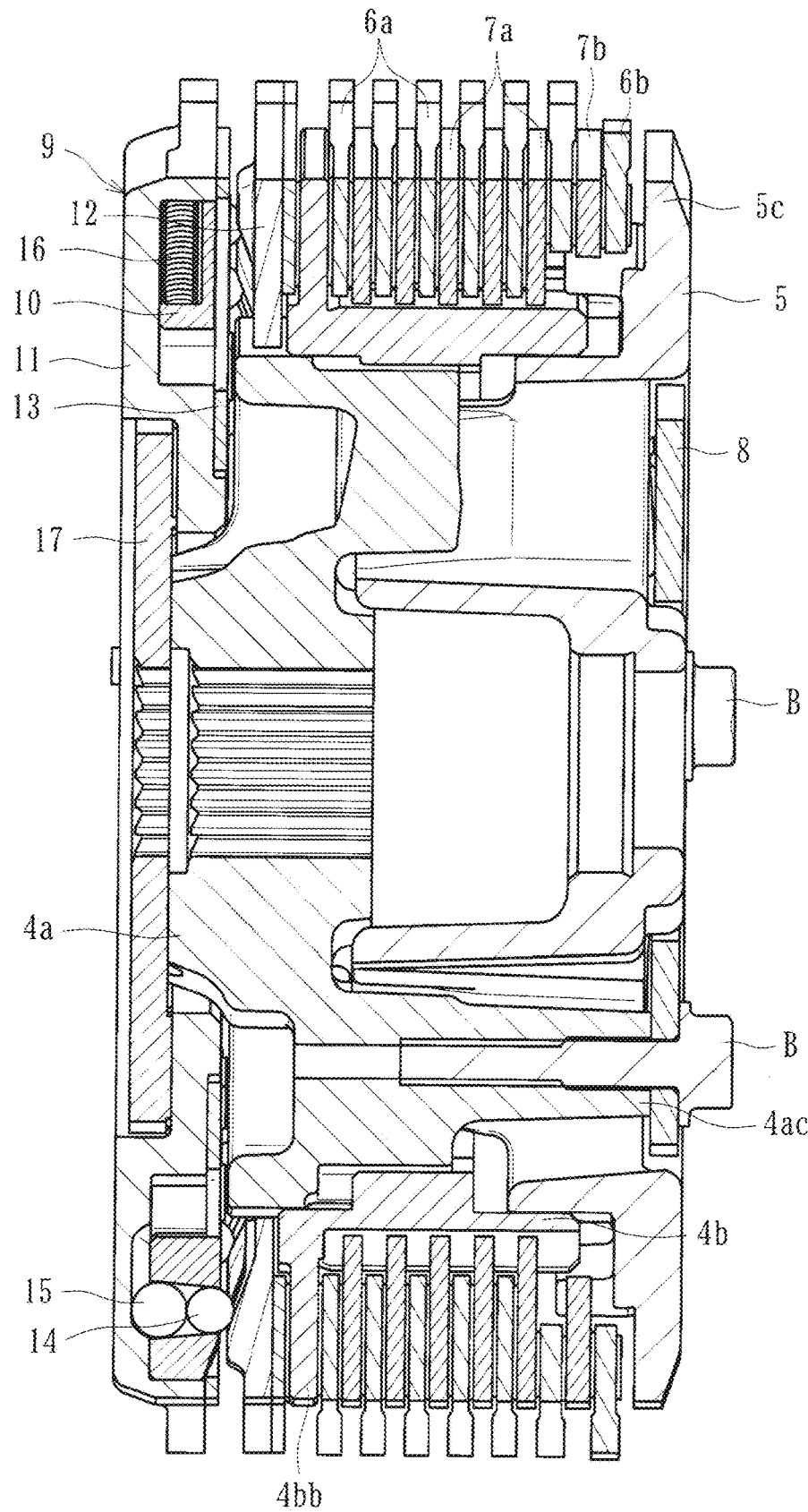
FIG. 21 is a cross-sectional view illustrating a state of the power transmission apparatus where each weight is located at the radially outer position and the clutch pressure plate is located at an operating position.

Specifically, when no centrifugal force is applied to the weights 10, the weights 10 are each held at the radially inner position (see FIG. 18) such that the pressing force exerted on the driving clutch plates (6a, 6b) and the driven clutch plates (7a, 7b) is released. Application of centrifugal force to the weights 10 causes each weight 10 to move outward as illustrated in FIG. 19 and then reach the radially outer position (see FIG. 20). This presses the driving clutch plates (6a, 6b) and the driven clutch plates (7a, 7b) against each other such that the driving force of the engine E is transmittable to the wheel T. FIG. 21 illustrates a state where when each weight 10 is located at the radially outer position, the clutch pressure plate 5 is moved to the non-operating position such that the pressing force exerted on the driving clutch plates (6a, 6b) and the driven clutch plates (7a, 7b) is released.

The auxiliary clutch plate 17 is disposed inside the clutch housing 2. The auxiliary clutch plate 17 is an annular structure different in diameter from the driving clutch plates (6a, 6b) and the driven clutch plates (7a, 7b). In the present preferred embodiment, the auxiliary clutch plate 17 is smaller in diameter than the driving clutch plates (6a, 6b) and the driven clutch plates (7a, 7b). As illustrated in FIG. 2, the output shaft 3 (i.e., the output) is inserted through a central opening of the auxiliary clutch plate 17 so as to be fitted thereto. The auxiliary clutch plate 17 includes a pushed surface facing the pushing surface 11c of the holder 11.

When the weights 10 are each located at the radially outer position, i.e., when the driving clutch plates (6a, 6b) and the driven clutch plates (7a, 7b) are pressed against each other, the auxiliary clutch plate 17 is able to transmit the driving force of the engine E to the output shaft 3 upon being pushed by the pushing surface 11c of the holder 11 and pressed against the pushing surface 11c. When the weights 10 are each located at the radially inner position, i.e., when the pressing force exerted on the driving clutch plates (6a, 6b) and the driven clutch plates (7a, 7b) is released, the auxiliary clutch plate 17 is able to cut off transmission of the driving force of the engine E to the output shaft 3 upon being relieved of a pressing force applied thereto, due to a decrease in pushing force exerted by the pushing surface 11c of the holder 11.

Upon movement of each weight 10 to the radially outer position, the inclined grooves 12a function as a cam so as to cause the holder 11 and the press 12 to move away from each other. Accordingly, the pushing surface 12c of the press 12 presses the driving clutch plates (6a, 6b) and the driven clutch plates (7a, 7b) against each other, and the pushing surface 11c of the holder 11 pushes the pushed surface of the auxiliary clutch plate 17 such that the pushed surface is pressed against the pushing surface 11c so as to transmit the driving force of the engine E to the driving wheel T.

The clutch pressure plate 5 according to the present preferred embodiment is provided with oil flow passages through which oil is allowed to flow to the driven clutch plate 7b attached to the clutch pressure plate 5. As illustrated in FIGS. 10 to 13, the oil flow passages each include an oil inlet 5e, a groove 5f, and an oil outlet 5g. The oil flow passages allow oil to flow toward the flange 5c of the clutch pressure plate 5 through the housing recesses 5d in which the clutch springs S are housed.

Figure 11:
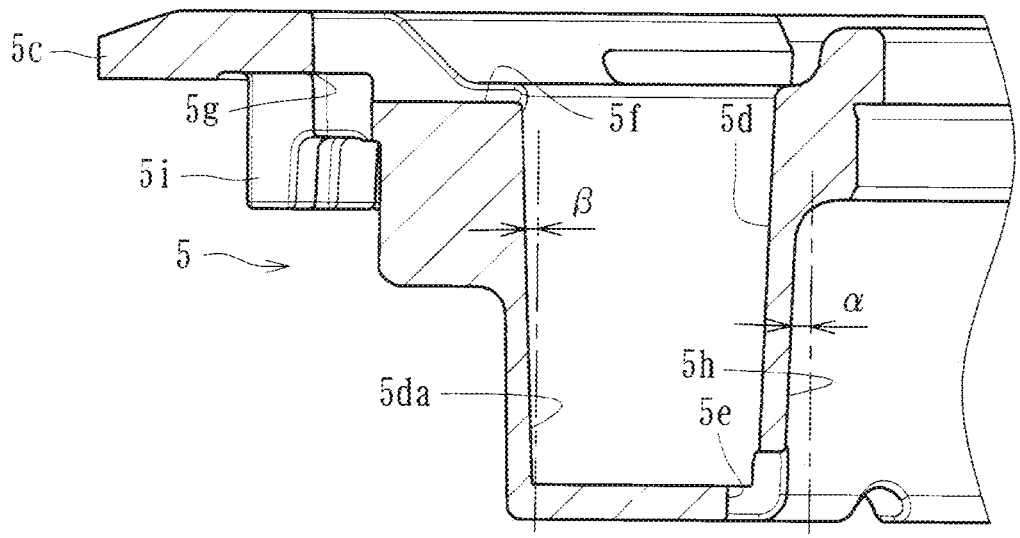
FIG. 11 is a cross-sectional view of the clutch pressure plate taken along the line XI-XI in FIG. 10.
Figure 12:
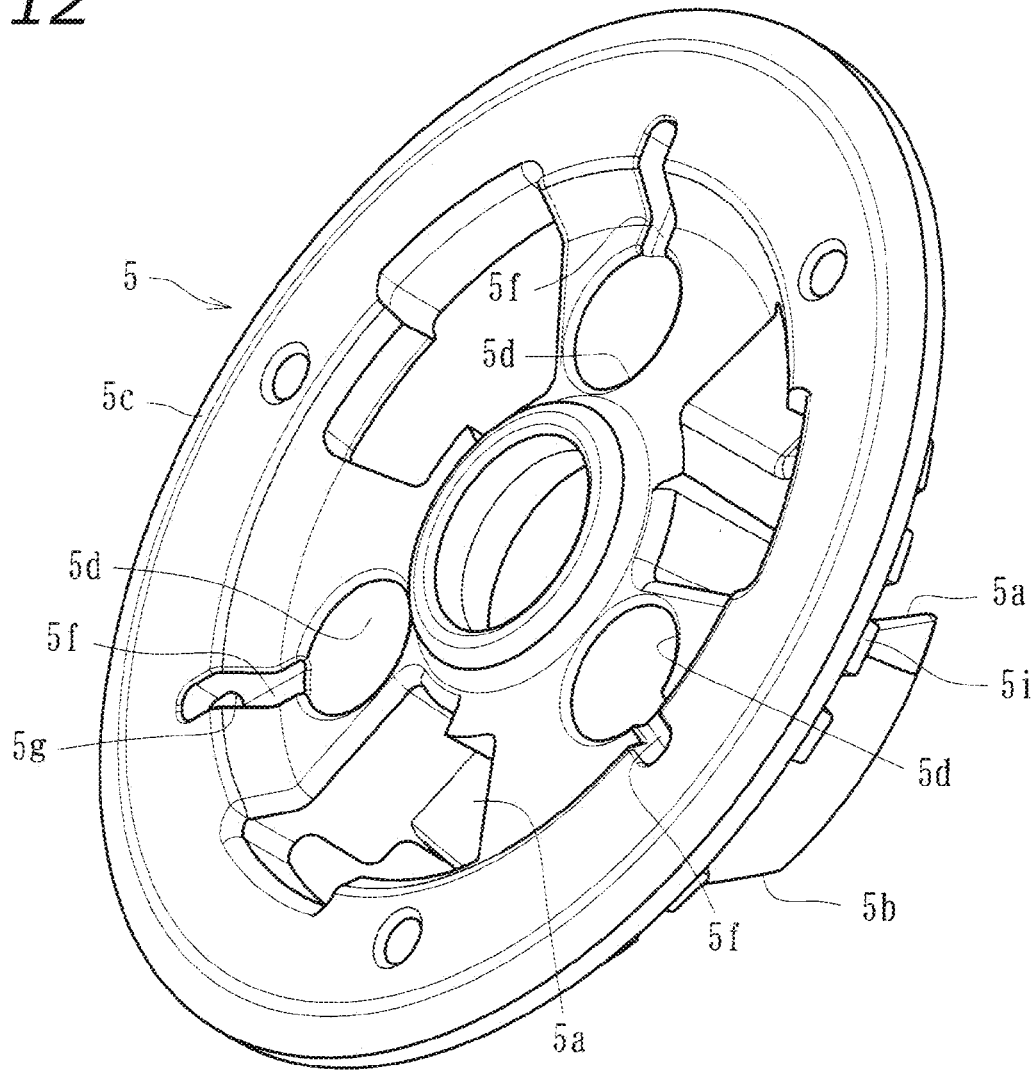
FIG. 12 is a front perspective view of the clutch pressure plate.
Figure 13:
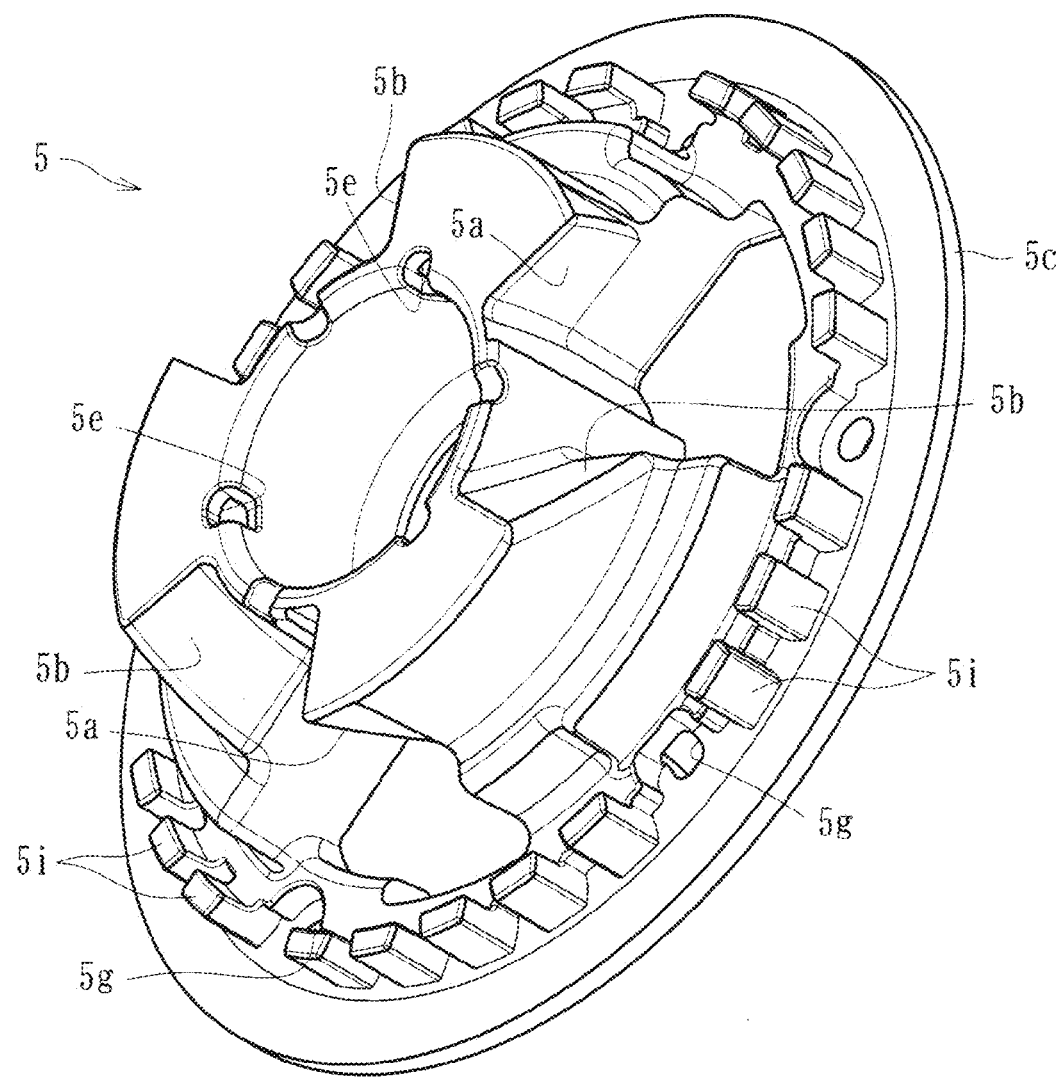
FIG. 13 is a rear perspective view of the clutch pressure plate.

As illustrated in FIGS. 11 and 13, each oil inlet 5e is a first hole defined adjacent to the bottom of the associated housing recess 5d (i.e., defined adjacent to a portion of the associated housing recess 5d that receives an end of the associated clutch spring S). Each oil inlet 5e is in communication with the associated housing recess 5d and opens toward the center of the clutch pressure plate 5. As illustrated in FIGS. 11 and 12, each oil outlet 5g is a second hole defined adjacent to the flange 5c of the clutch pressure plate 5. Each oil outlet 5g opens toward the radially outer end of the clutch pressure plate 5.

Each groove 5f has a groove geometry defined in the surface of the clutch pressure plate 5. Each groove 5f brings the opening edge of the associated housing recess 5d into communication with the associated oil outlet 5g (i.e., the associated second hole) and thus allows oil to flow from the opening edge of the associated housing recess 5d to the associated oil outlet 5g (i.e., the associated second hole). As illustrated in FIG. 3, with centrifugal force, oil supplied from the insertion hole 3a (see the arrow R1 in FIG. 3) flows along a surface 5h of the clutch pressure plate 5 (which is radially inward of the housing recesses 5d), reaches the oil inlets 5e (i.e., the first holes), and then flows into the housing recesses 5d through the oil inlets 5e (see the arrow R2 in FIG. 3).

The oil, which has flowed into the housing recesses 5d as described above, flows to the openings of the housing recesses 5d along inner peripheral surfaces 5da thereof, flows through the grooves 5f, and then flows out of the oil outlets 5g (see the arrow R3 in FIG. 3). The oil, which has flowed out of the oil outlets 5g, reaches the driven clutch plate 7b attached to the clutch pressure plate 5, so that the oil is supplied to the driven clutch plate 7b, the driving clutch plate 6b adjacent to the driven clutch plate 7b, and the driving clutch plate 6a adjacent to the driven clutch plate 7b. Accordingly, oil is supplied to the driven clutch plates 7a and the driving clutch plates 6a adjacent to each other through the oil supply holes 4ad of the first clutch 4a and the oil supply holes 4bc of the second clutch 4b, and in addition, oil is supplied to the driven clutch plate 7b and the driving clutch plate 6badjacent to the driven clutch plate 7b through the oil inlets 5e, the grooves 5f, and the oil outlets 5g, which define the oil flow passages of the clutch pressure plate 5.

In the present preferred embodiment, the surface 5h has a draft angle α and the inner peripheral surface 5da of each housing recess 5d has a draft angle β as illustrated in FIG. 11. Accordingly, oil flowing along the surface 5h smoothly flows to the oil inlets 5e due to the draft angle α, and oil flowing along the inner peripheral surfaces 5*da* smoothly flows to the grooves 5*f* due to the draft angle β.

In the present preferred embodiment, the driven clutch plates (7*a*) are attached to the clutch (or the second clutch 4*b*), and the driven clutch plate (7*b*) is attached to the clutch pressure plate 5. The clutch pressure plate 5 is provided with the oil flow passages through which oil is allowed to flow to the driven clutch plate 7*b* attached to the clutch pressure plate 5. Accordingly, the oil is sufficiently suppliable to the driven clutch plate 7*b* attached to the clutch pressure plate 5 and the driving clutch plate 6*b* adjacent to the driven clutch plate 7*b*.

The clutch pressure plate 5 according to the present preferred embodiment includes the housing recesses 5*d* in which the clutch springs S are housed, and the flange 5*c* that is able to press the driven clutch plates (7*a*, 7*b*) and the driving clutch plates (6*a*, 6*b*) against each other. The oil flow passages allow oil to flow toward the flange 5*c* through the housing recesses 5*d*. Accordingly, the oil is suppliable through the housing recesses 5*d* to the driven clutch plate 7*b* attached to the clutch pressure plate 5.

The oil flow passages each include the oil inlet 5*e* in communication with the associated housing recess 5*d* and opening toward the center of the clutch pressure plate 5, and the oil outlet 5*g* opening toward the radially outer end of the clutch pressure plate 5. Oil that has flowed into the housing recesses 5*d* through the oil inlets 5*e* flows out of the oil outlets 5*g* such that the oil is allowed to flow to the driven clutch plate 7*b* attached to the clutch pressure plate 5. Accordingly, with centrifugal force, oil flows through the housing recesses 5*d* and is thus smoothly suppliable to the driven clutch plate 7*b* attached to the clutch pressure plate 5.

Each oil inlet 5*e* includes the first hole adjacent to the bottom of the associated housing recess 5*d* that receives an end of the associated clutch spring S. Each oil outlet 5*g* includes the second hole defined adjacent to the flange 5*c* of the clutch pressure plate 5. The oil flow passages each include the groove 5*f* through which oil is allowed to flow from the opening edge of the associated housing recess 5*d* to the associated second hole. Accordingly, oil that has flowed into the housing recesses 5*d* through the first holes (i.e., the oil inlets) is allowed to flow to the openings of the housing recesses 5*d* and then flow out of the second holes (i.e., the oil outlets) through the grooves 5*f*. Consequently, the oil is reliably suppliable to the driven clutch plate 7*b* attached to the clutch pressure plate 5.

The clutch according to the present preferred embodiment (which includes the first clutch 4*a* and the second clutch 4*b*) is provided with the oil supply holes (4*ad*, 4*bc*) through which oil is allowed to flow to the driven clutch plates 7*a* attached to the clutch (which includes the first clutch 4*a* and the second clutch 4*b*). Accordingly, oil is sufficiently suppliable to the driven clutch plates (7*a*) attached to the clutch (or the second clutch 4*b*) and the driven clutch plate (7*b*) attached to the clutch pressure plate 5.

The clutch according to the present preferred embodiment includes the first clutch 4*a* connected to the output, and the second clutch 4*b* having the driven clutch plates 7*a* attached thereto. The first clutch 4*a* and the second clutch 4*b* are respectively provided with the oil supply holes (4*ad*) and the oil supply holes (4*bc*). Accordingly, if the clutch is divided into the first clutch 4*a* and the second clutch 4*b*, oil would be reliably suppliable to the driven clutch plates (7*a*) attached to the second clutch 4*b* and the driven clutch plate (7*b*) attached to the clutch pressure plate 5.

Figure 22:
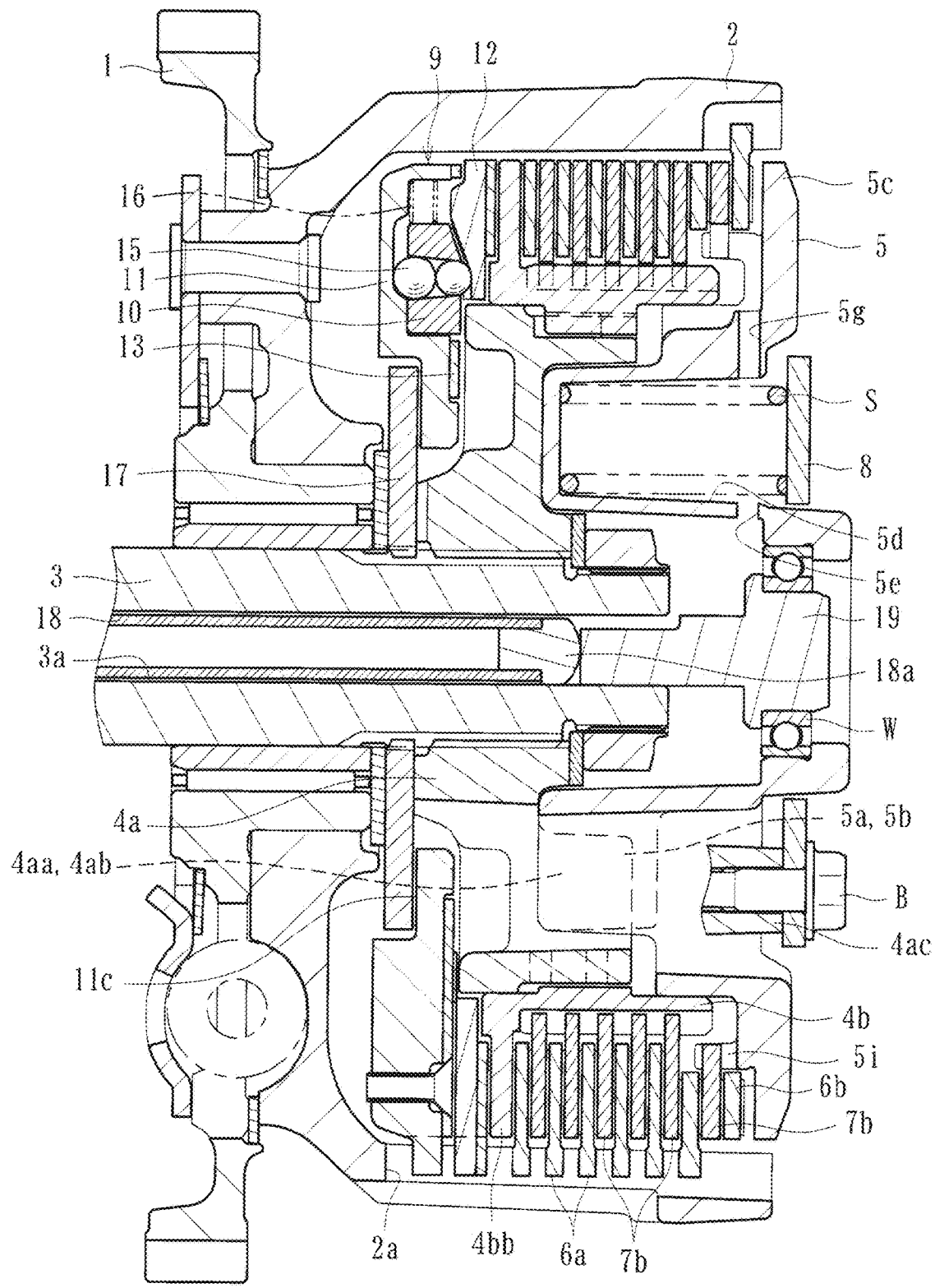
FIG. 22 is a vertical cross-sectional view of a power transmission apparatus according to another preferred embodiment of the present invention.
Figure 23:
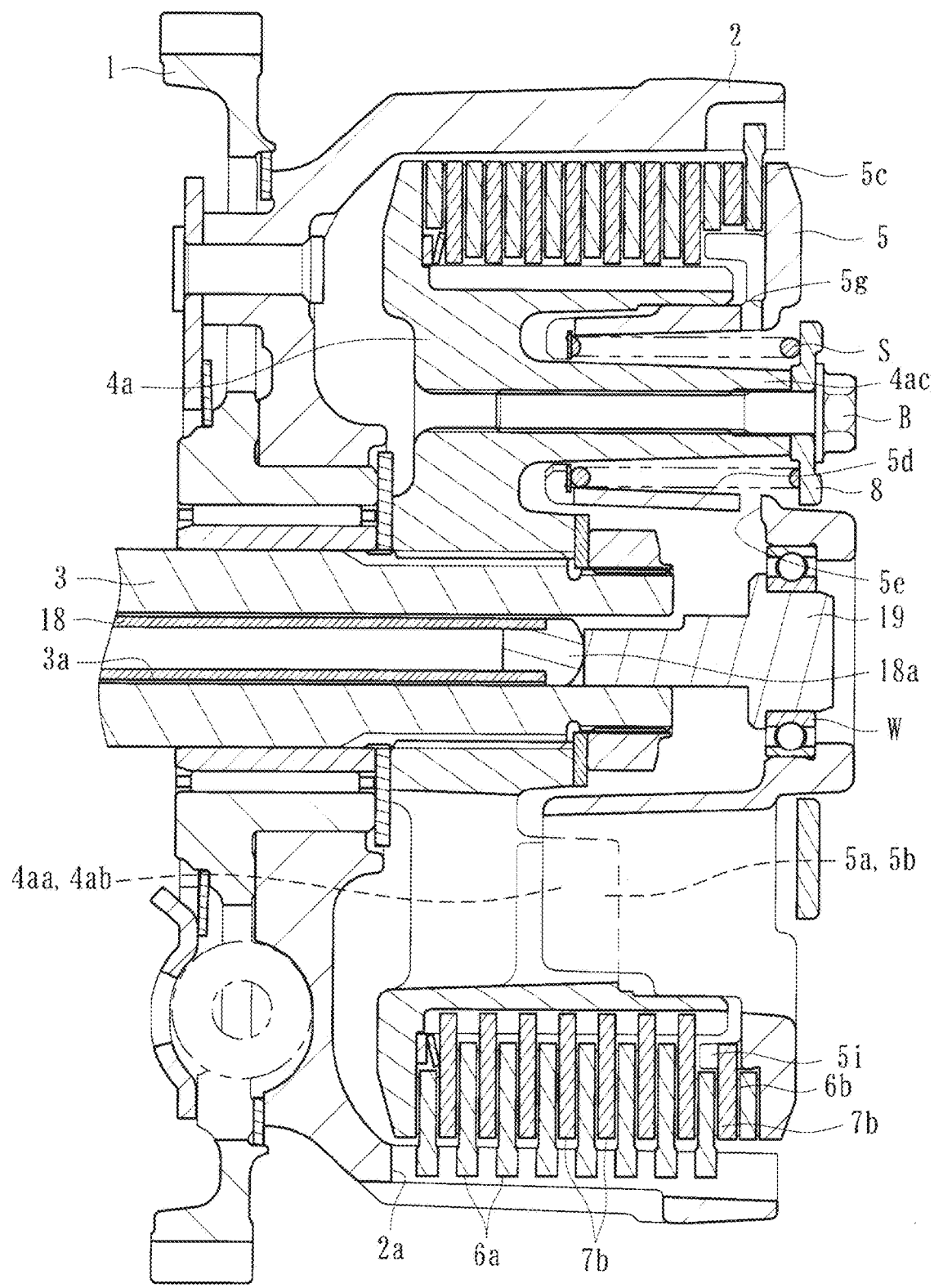
FIG. 23 is a vertical cross-sectional view of a power transmission apparatus according to still another preferred embodiment of the present invention.

Although the present preferred embodiment has been described thus far, the present invention is not limited to this preferred embodiment. Alternatively, the components of each oil flow passage may be provided at positions different from those described above. As illustrated in FIG. 22, for example, the oil flow passages may each include the oil inlet 5*e* located adjacent to the opening of the associated housing recess 5*d*, and the oil outlet 5*g* in communication with the opening of the associated housing recess 5*d*, with no groove 5*f* therebetween. As illustrated in FIG. 23, a preferred embodiment of the present invention may be applied to a power transmission apparatus configured such that the clutch has an undivided structure, no centrifugal clutch 9 is provided, each boss 4*ac* is protruded into the associated housing recess 5*d*, and each housing recess 5*d* is in communication with the associated oil inlet 5*e* and the associated oil outlet 5*g*.

Figure 24:
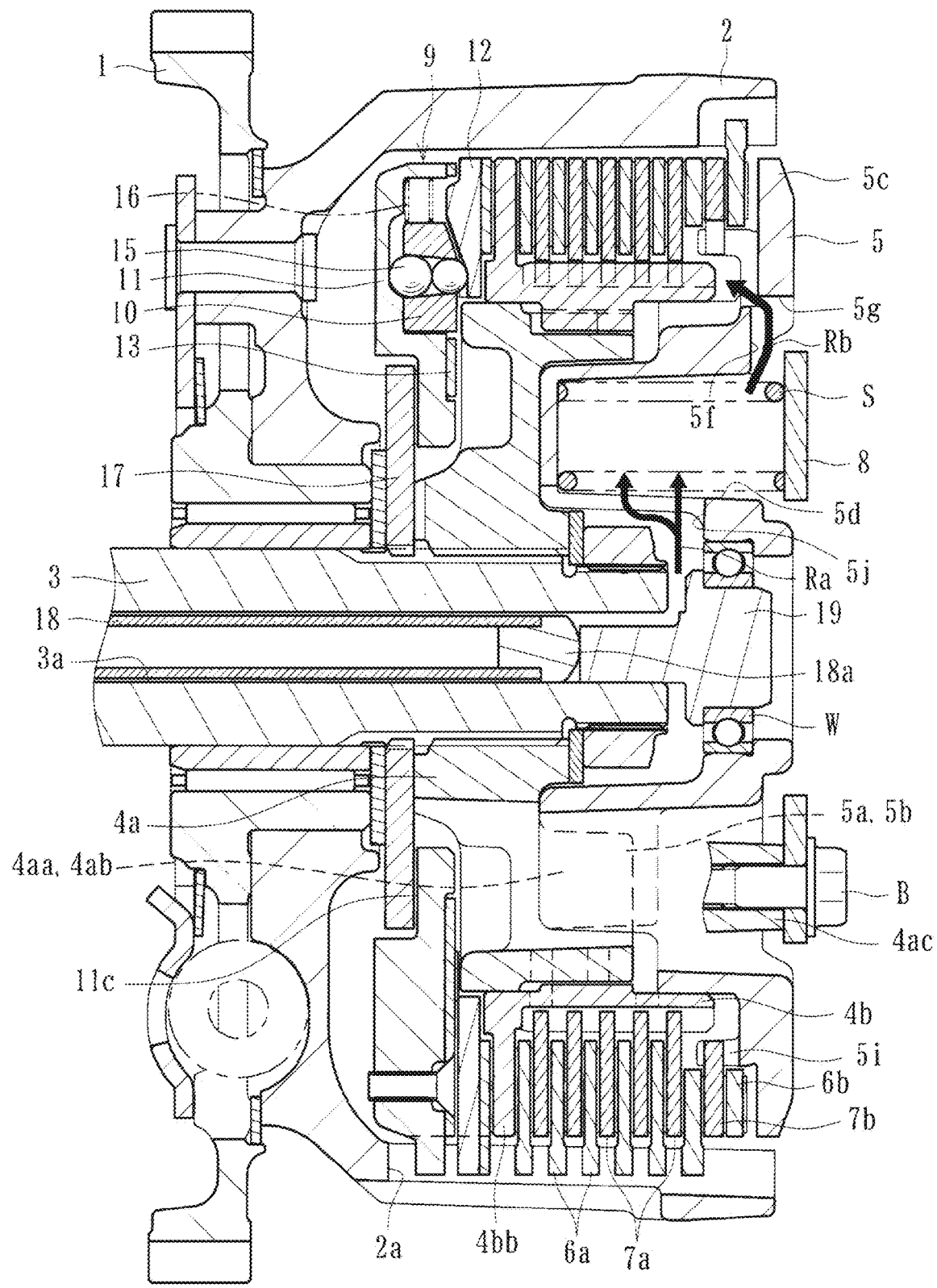
FIG. 24 is a vertical cross-sectional view of a power transmission apparatus according to yet another preferred embodiment of the present invention (which includes an oil inlet in the form of an elongated hole).
Figure 25:
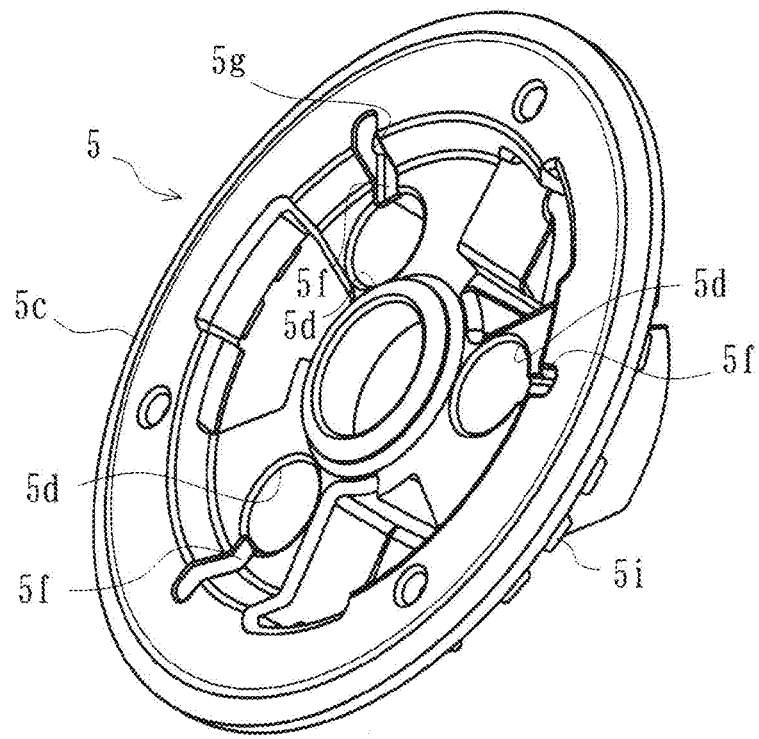
FIG. 25 is a front perspective view of a clutch pressure plate of the power transmission apparatus.
Figure 26:
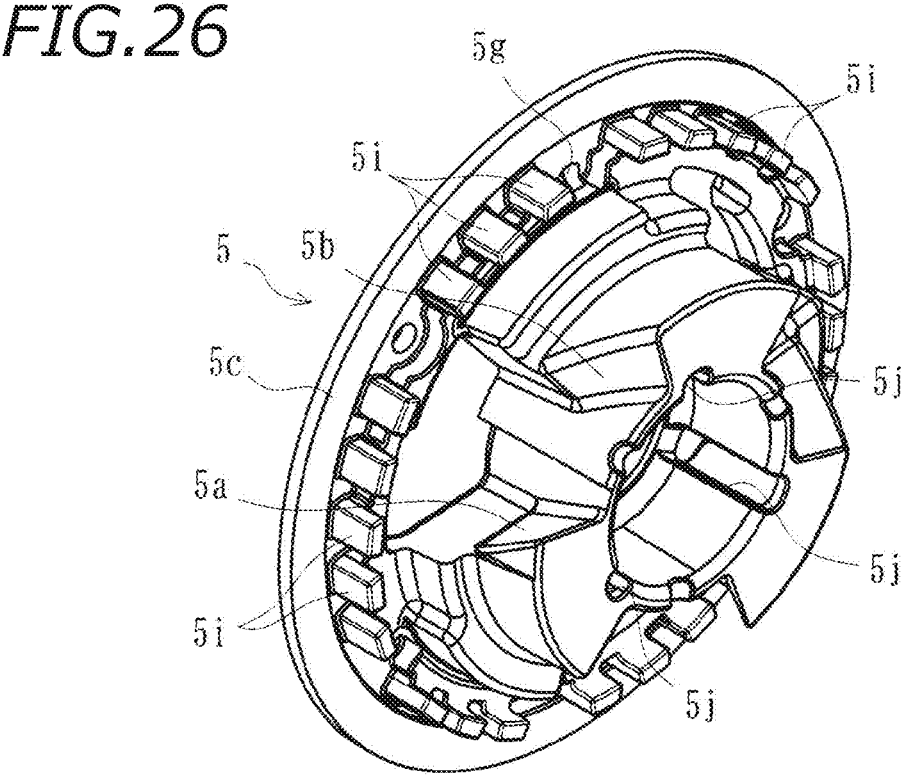
FIG. 26 is a rear perspective view of the clutch pressure plate of the power transmission apparatus.

As illustrated in FIGS. 24 to 26, the oil flow passages may each include, instead of the oil inlet 5*e* defined adjacent to the bottom of the associated housing recess 5*d*, an oil inlet 5*j* in communication with the associated housing recess 5*d* and opening inward (i.e., opening toward the center of the clutch pressure plate 5). As illustrated in FIG. 26, each oil inlet 5*j* is an elongated hole that is an opening extending in the axial direction of the clutch pressure plate 5. The oil flow passages each include the oil inlet 5*j*, the groove 5*f* (which is similar to that in the foregoing preferred embodiment), and the oil outlet 5*g* (which is similar to that in the foregoing preferred embodiment). As illustrated in FIG. 24, with centrifugal force, oil supplied from the insertion hole 3*a* thus flows into the housing recesses 5*d* through the oil inlets 5*j* that are openings elongated in the axial direction (see the arrow Ra in FIG. 24), flows through the grooves 5*f*, and then flows out of the oil outlets 5*g* (see the arrows Rb in FIG. 24).

The oil flow passages may each be any passage that is defined in the clutch pressure plate 5 and allows oil to flow to the driven clutch plate 7*b* attached to the clutch pressure plate 5. The oil flow passages may be passages that require no involvement of the housing recesses 5*d*. The power transmission apparatuses according to preferred embodiments of the present invention may find applications as various multiple-plate clutch type power transmission apparatuses for, for example, motorcycles, automobiles, three-wheel or four-wheel buggies, or general purpose machines.

An inventive power transmission apparatus according to a preferred embodiment of the present invention includes driven clutch plates attached to a clutch and a driven clutch plate attached to a clutch pressure plate. The clutch pressure plate includes oil flow passages through which oil is allowed to flow to the driven clutch plate attached to the clutch pressure plate. The power transmission apparatus may find applications involving, for example, change(s) in external shape or addition of other function(s).

While preferred embodiments of the present invention have been described above, it is to be understood that variations and modifications will be apparent to those skilled in the art without departing from the scope and spirit of the present invention. The scope of the present invention, therefore, is to be determined solely by the following claims.

The invention claimed is:

1. A power transmission apparatus comprising:
    a clutch housed in a clutch housing rotatable together with an input that rotates with a driving force of an engine of a vehicle, the clutch housing having a plurality of driving clutch plates attached thereto, the clutch having a plurality of driven clutch plates attached thereto, the driven clutch plates being arranged alternately with the driving clutch plates, the clutch being connected to an output that is able to rotate a wheel of the vehicle;

a clutch pressure plate movable between an operating position where the driving and driven clutch plates are pressed against each other with a pressing force so as to enable transmission of the driving force of the engine to the wheel and a non-operating position where the pressing force exerted on the driving and driven clutch plates is released so as to cut off transmission of the driving force of the engine to the wheel; and a clutch spring to urge the driving and driven clutch plates in a direction in which the driving and driven clutch plates are to be pressed against each other or in a direction in which the driving and driven clutch plates are to be moved away from each other; wherein the driven clutch plates include first and second driven clutch plates respectively attached to the clutch and the clutch pressure plate;

the clutch pressure plate includes:
  a housing recess in which the clutch spring is housed;
  a side wall extending in an axial direction of the output, defining the housing recess, and at least partially located between a portion of the clutch spring and the output in a radial direction of the output, the portion of the clutch spring being a closest portion of the clutch spring to the output in the radial direction;
  a bottom wall continuous with the side wall, extending in the radial direction, and defining the housing recess;
  an oil inlet port in a portion of a boundary region between the side wall and the bottom wall, the portion at least partially facing the output in the radial direction, the oil inlet port allowing oil to flow into the housing recess; and
  an oil supply hole through which oil that has flowed into the housing recess is supplied to the second driven clutch plate attached to the clutch pressure plate; and
  an entirety of the oil supply hole is spaced apart from the oil inlet port in the axial direction of the output, and does not overlap the oil inlet port in the radial direction of the output.

2. The power transmission apparatus according to claim 1, wherein the oil inlet port is in the portion of the boundary region closest to the output in the radial direction and opens toward the output.

3. The power transmission apparatus according to claim 1, wherein the clutch includes:
  a first clutch connected to the output; and
  a second clutch having the first driven clutch plates attached thereto; and
  each of the first clutch and the second clutch includes a plurality of oil supply holes through which oil flows to the first driven clutch plates attached to the second clutch.

4. A power transmission apparatus comprising:
a clutch housed in a clutch housing rotatable together with an input that rotates with a driving force of an engine of a vehicle, the clutch housing having a plurality of driving clutch plates attached thereto, the clutch having a plurality of driven clutch plates attached thereto, the driven clutch plates being arranged alternately with the driving clutch plates, the clutch being connected to an output that is able to rotate a wheel of the vehicle;

a clutch pressure plate movable between an operating position where the driving and driven clutch plates are pressed against each other with a pressing force so as to enable transmission of the driving force of the engine to the wheel and a non-operating position where the pressing force exerted on the driving and driven clutch plates is released so as to cut off transmission of the driving force of the engine to the wheel; and a clutch spring to urge the driving and driven clutch plates in a direction in which the driving and driven clutch plates are to be pressed against each other or in a direction in which the driving and driven clutch plates are to be moved away from each other; wherein the driven clutch plates include first and second driven clutch plates respectively attached to the clutch and the clutch pressure plate; and the clutch pressure plate includes:
  a housing recess in which the clutch spring is housed;
  a flange located radially outward of the housing recess to press the driving and driven clutch plates against each other; and
an oil supply hole at an opening end of the housing recess and at least partially located radially outward of the housing recess and through which oil is supplied to the second driven clutch plate attached to the clutch pressure plate, the opening end being an end of the housing recess located closest to the flange in an axial direction of the output.

5. The power transmission apparatus according to claim 4, wherein a portion of the oil supply hole is located in the flange.

6. The power transmission apparatus according to claim 4, wherein
  the clutch pressure plate includes an oil inlet port in communication with the housing recess and opening toward a center of the clutch pressure plate;
  the oil inlet port is a first hole adjacent to a bottom of the housing recess that receives an end of the clutch spring;
  the oil supply hole is a second hole opening toward a radially outer end of the clutch pressure plate;
  the clutch pressure plate includes a groove through which oil is allowed to flow from an opening edge of the housing recess to the second hole; and
  oil that has flowed into the housing recess through the first hole flows out of the second hole through the groove and then flows to the second driven clutch plate attached to the clutch pressure plate.

* * * * *